(12) United States Patent
Furuhata et al.

(10) Patent No.: US 11,590,618 B2
(45) Date of Patent: Feb. 28, 2023

(54) WORKPIECE GRIPPING DEVICE

(71) Applicant: JTEKT CORPORATION, Osaka (JP)

(72) Inventors: Tetsuro Furuhata, Nagoya (JP);
Masaki Ichikawa, Kuwana (JP)

(73) Assignee: JTEKT CORPORATION, Kariya (JP)

( * ) Notice: Subject to any disclaimer, the term of this patent is extended or adjusted under 35 U.S.C. 154(b) by 362 days.

(21) Appl. No.: 16/919,346

(22) Filed: Jul. 2, 2020

(65) Prior Publication Data

US 2021/0001440 A1    Jan. 7, 2021

(30) Foreign Application Priority Data

Jul. 3, 2019 (JP) .............................. JP2019-124357

(51) Int. Cl.
*B23Q 3/08* (2006.01)

(52) U.S. Cl.
CPC .......... *B23Q 3/082* (2013.01); *B23Q 2703/04* (2013.01)

(58) Field of Classification Search
CPC ........ B25B 5/087; B25B 1/18; B25J 15/0047; B25J 15/0028; B23Q 3/068; B23Q 3/082
See application file for complete search history.

(56) References Cited

U.S. PATENT DOCUMENTS 3,730,539 A * 5/1973 Swanson ................. B23B 31/18
                                                        279/4.12
6,089,577 A * 7/2000 Takada .................... B25J 15/028
                                                        279/121

FOREIGN PATENT DOCUMENTS

JP       2001-071225 A         3/2001
JP       2005177964 A  *       7/2005

* cited by examiner

*Primary Examiner* — Tyrone V Hall, Jr.
(74) *Attorney, Agent, or Firm* — Oblon, McClelland, Maier & Neustadt, L.L.P.

(57) ABSTRACT

A cylinder case includes a first main path communicating first port with an end surface, a second main path communicating a second port with the end surface, first and second front chamber paths respectively communicating a front chamber with the end surface, and first and second rear chamber paths respectively communicating a rear chamber with the end surface. A manifold block includes a first intermediate path communicating first and second manifold holes opened in an abutting surface with each other and a second intermediate path communicating third and fourth manifold holes opened in the abutting surface. The manifold block configured to be attached and fixed to the cylinder case such that the abutting surface is abutted against the end surface and a relative position of the abutting surface with respect to the end surface portion is capable of being selected from a first position and a second position.

7 Claims, 25 Drawing Sheets

WORKPIECE GRIPPING DEVICE

CROSS REFERENCE TO RELATED APPLICATIONS

This application claims priority to Japanese Patent Application No. 2019-124357 filed on Jul. 3, 2019, the content of which is incorporated herein by reference.

BACKGROUND

Field of the Invention

The present invention relates to a workpiece gripping device.

Related Art

A workpiece gripping device used in related art is configured to open and close a multi-claw chuck by a hydraulic cylinder in a radial direction to grip a workpiece (see JP-2001-71225-A, for example). Such a workpiece gripping device is commonly configured to clamp the workpiece when a piston of the hydraulic cylinder is driven to retract. A cylinder case of the hydraulic cylinder includes a sealed port that allows to be supplied with pressure oil from outside during rotation. The pressure oil supplied through the port during the rotation is supplied to a front chamber of the cylinder case through a path in the cylinder case, so that the piston is retracted.

An outer diameter gripping chuck for gripping an outer diameter of the workpiece is configured to grip the outer diameter of the workpiece by pulling a wedge plunger back and moving claws radially inward, so that the cylinder case described above can be directly used in the workpiece gripping device with the outer diameter gripping chuck.

Meanwhile, an inner diameter gripping chuck for gripping an inner diameter of the workpiece is configured to grip the inner diameter of the workpiece by pushing the wedge plunger forward and moving the claws radially outward. Increasing the number of the sealed port, which allows to be supplied with pressure oil from outside during rotation, to enable to switch and use the inner diameter gripping chuck and the outer diameter gripping chuck has technically difficulty and may increase costs. Pre-made cylinder case components provided with different pressure oil paths are costly and require replacement and time for performing the replacement.

SUMMARY

Embodiments of the present invention provides a workpiece gripping device that allows easily changing fluid paths of a cylinder in accordance with types of chucks.

According to an embodiment of the present invention, the workpiece gripping device includes: a chuck including an operation body capable of moving forward and backward along an axial direction of a central axis and a plurality of claws arranged around the central axis, the plurality of claws being capable of moving in a radial direction along with forward and backward movement of the operation body; a fluid pressure cylinder including a cylinder case coaxially arranged on a rear side of the chuck and a piston fitted in an internal space of the cylinder case and dividing the internal space in the axial direction into a front chamber and a rear chamber, the piston being configured to drive the operation body forward and backward.

Moreover, the cylinder case includes: first and second supply and discharge paths respectively communicating first and second supply and discharge ports, which are configured to supply and discharge a fluid, with the end surface; third and fourth supply and discharge paths respectively communicating third and fourth supply and discharge ports, which are configured to supply and discharge a fluid, with the end surface; first and second front chamber paths communicating the front chamber with the end surface; and first and second rear chamber paths communicating the rear chamber with the end surface. The manifold block is configured to be attached and fixed to the cylinder case such that the abutting surface is abutted against the end surface and a relative position of the abutting surface with respect to the end surface portion is capable of being selected from a first position and a second position, when the manifold block is attached and fixed to the cylinder case at the first position, the first supply and discharge path communicates with the first front chamber path via the first intermediate path, and the first rear chamber path communicates with the third supply and discharge path via the second intermediate path, and when the manifold block is attached and fixed to the cylinder case at the second position, the second supply and discharge path communicates with the second rear chamber path via the third intermediate path, and the second front chamber path communicates with the fourth supply and discharge path via the fourth intermediate path.

According to the above configuration, when the outer diameter gripping chuck is used, the manifold block is attached and fixed to the cylinder case at the first position. In such a state, when a fluid is supplied from the first supply and discharge port to the first supply and discharge path, the fluid flows into the front chamber via the first intermediate path and the first front chamber path, and the piston is moved backward. At this time, the fluid flows from the rear chamber into the first rear chamber path due to the backward movement of the piston, and is discharged from the third supply and discharge port via the second intermediate path and the third supply and discharge path. That is, by moving backward the operation body of the chuck by driving of the backward movement of the piston, the claws are moved radially inward to grip (clamp) the outer diameter of the workpiece.

On the other hand, when the fluid is supplied from the third supply and discharge port to the third supply and discharge path, the fluid flows into the rear chamber via the second intermediate path and the first rear chamber path, and the piston is moved forward. At this time, the fluid flows from the front chamber to the first front chamber path due to the forward movement of the piston, and is discharged from the first supply and discharge port via the first intermediate path and the first supply and discharge path. That is, by moving forward the operation body of the chuck by driving of the forward movement of the piston, the claws are moved radially outward to release the gripping of (unclamp) the outer diameter of the workpiece.

When the inner diameter gripping chuck is used, the manifold block is attached and fixed to the cylinder case at the second position. In such a state, when the fluid is supplied from the second supply and discharge port to the second supply and discharge path, the fluid flows into the rear chamber via the third intermediate path and the second rear chamber path, and the piston is moved forward. At this time, the fluid flows from the front chamber to the second front chamber path due to the forward movement of the piston, and is discharged from the fourth supply and discharge port via the fourth intermediate path and the fourth supply and discharge path. That is, by moving forward the operation body of the chuck by the driving of the forward movement of the piston, the claws are moved radially outward to grip (clamp) the inner diameter of the workpiece.

On the other hand, when the fluid is supplied from the fourth supply and discharge port to the fourth supply and discharge path, the fluid flows into the front chamber via the fourth intermediate path and the second front chamber path, and the piston is moved backward. At this time, the fluid flows from the rear chamber into the second front chamber path due to the backward movement of the piston, and is discharged from the second supply and discharge port via the third intermediate path and the second supply and discharge path. That is, by moving backward the operation body of the chuck by the driving of the backward movement of the piston, the claws are moved radially inward to release the gripping of (unclamp) the inner diameter of the workpiece.

Thus, changing the attachment and fixing of the manifold block to the cylinder case between the first position and the second position provides easy switching between a fluid path for use of the outer diameter gripping chuck and a fluid path for use of the inner diameter gripping chuck without performing component replacement of the cylinder case or the like. This provides a workpiece gripping device that allows easily changing fluid paths of a cylinder in accordance with types of chucks.

DETAILED DESCRIPTION OF THE EXEMPLARY EMBODIMENTS

Hereinafter, a workpiece gripping device according to an embodiment of the present invention will be described with reference to the drawings.

(1. Overall Configuration of Workpiece Gripping Device 1)

Figure 1:
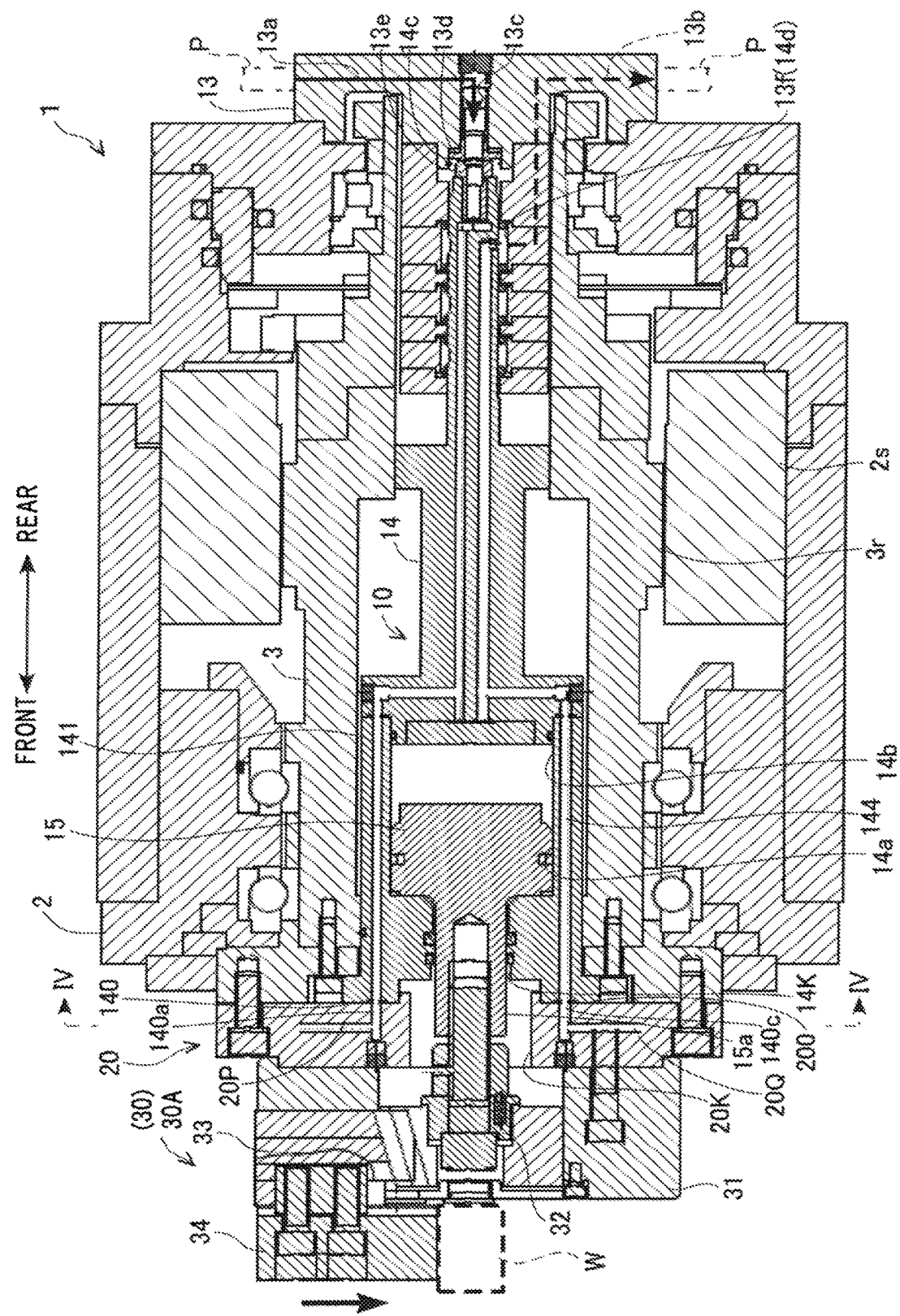
FIG. 1 is a cross-sectional view showing an overall configuration of a workpiece gripping device according to an embodiment of the present invention in a state where an outer diameter gripping chuck is used and a piston is located at a forward movement end.
Figure 2:
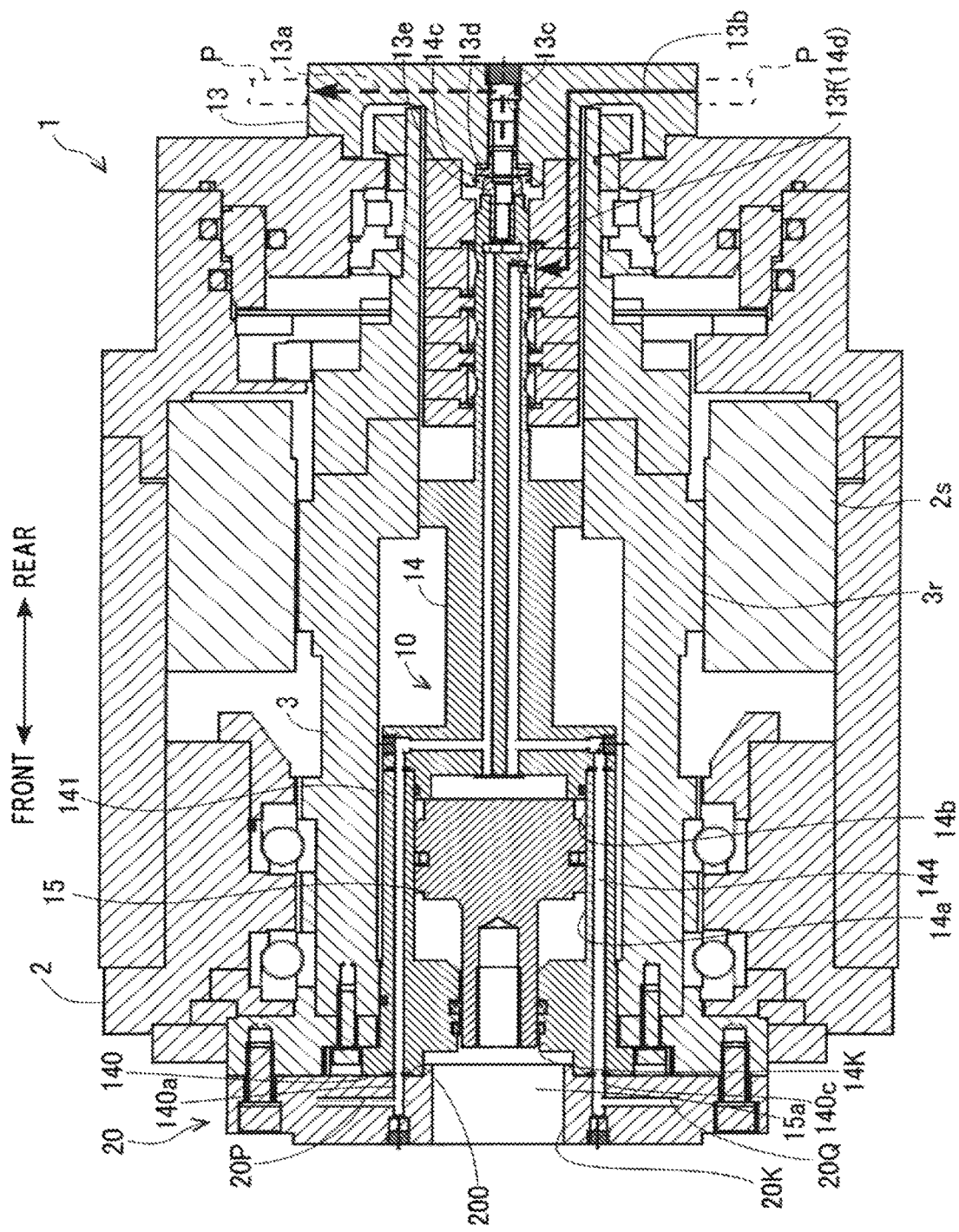
FIG. 2 is a cross-sectional view showing the workpiece gripping device in a state where the piston is located at a backward movement end.
Figure 3:
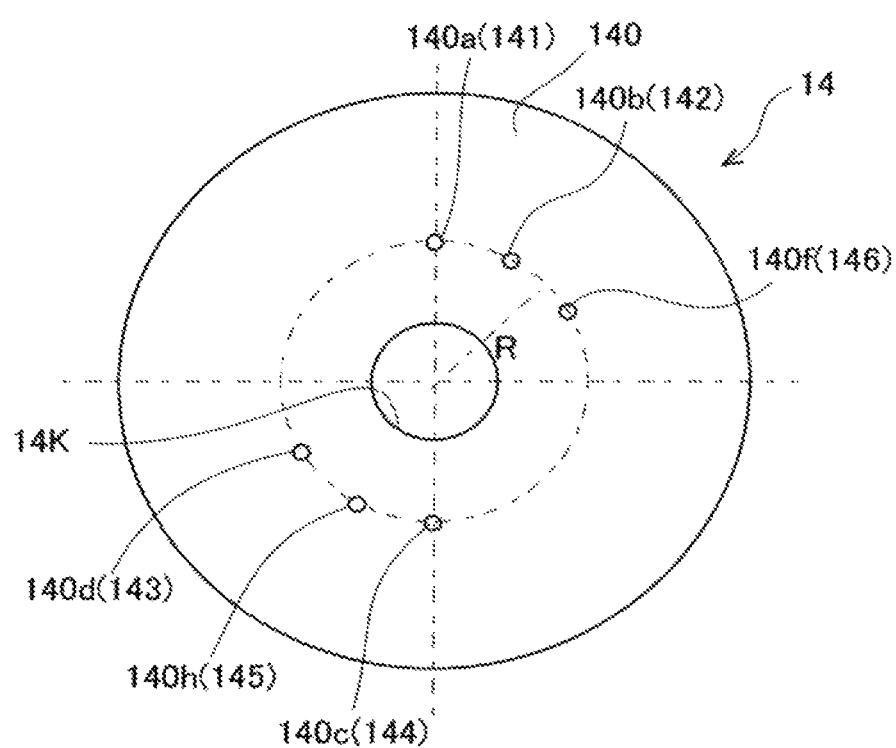
FIG. 3 is a front view of a front end surface of a cylinder case of the workpiece gripping device.
Figure 4:
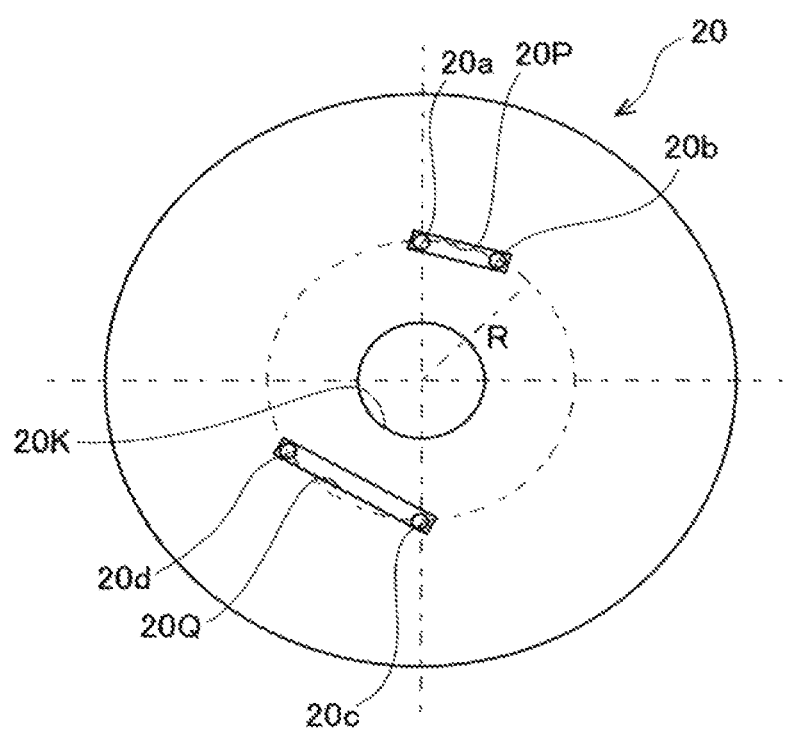
FIG. 4 is a cross-sectional view of a manifold block taken along line IV-IV in FIG. 1.
Figure 8:
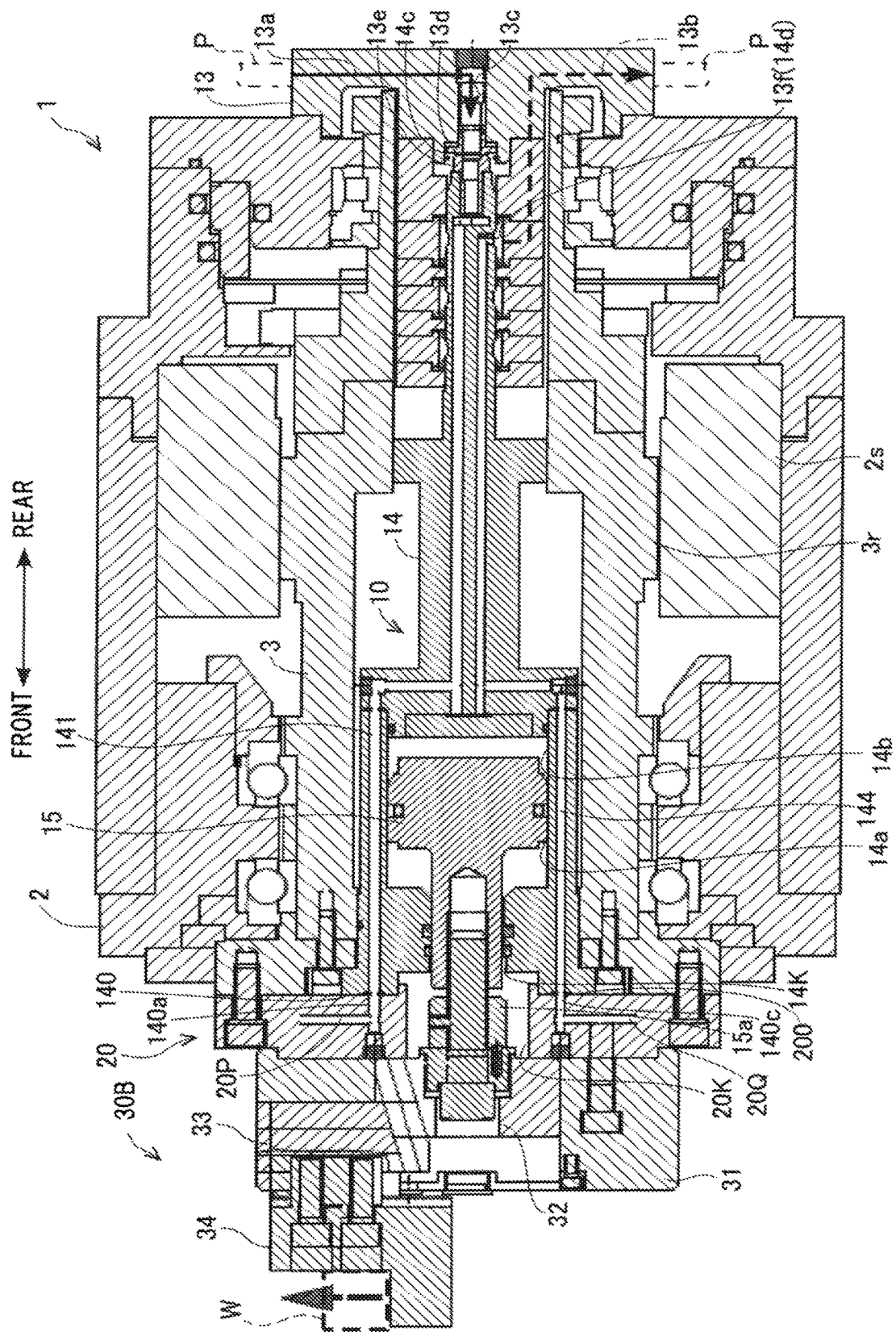
FIG. 8 is a cross-sectional view showing the overall configuration of the workpiece gripping device in a state where an inner diameter gripping chuck is used and the piston is located at the backward movement end.

An overall configuration of a workpiece gripping device 1 according to the embodiment of the present invention will be described with reference to FIGS. 1 to 4 and FIG. 8. The workpiece gripping device 1 is a spindle rotating device configured to grip and rotate a workpiece, and includes: a housing 2; a main shaft spindle 3; a hydraulic cylinder 10; a manifold block 20; and a chuck 30. FIG. 1 is a cross-sectional view showing a state where an outer diameter gripping chuck 30A is attached to the workpiece gripping device 1 and a piston 15 is located at a forward movement end. FIG. 2 is a cross-sectional view showing a state where the piston 15 is located at a backward movement end in the workpiece gripping device 1, and the chuck 30 is not shown. FIG. 3 is a front view of a front end surface 140 of a cylinder case 14 (hereinafter, also referred to as a cylinder case front end surface 140). FIG. 4 is a cross-sectional view of the manifold block 20 taken along line IV-IV in FIG. 1. FIG. 8 is a cross-sectional view showing a state where an inner diameter gripping chuck 30B is attached to the workpiece gripping device 1 and the piston 15 is located at the backward movement end.

The housing 2 has a substantially cylindrical shape which includes an accommodating space therein. The housing 2 accommodates the main shaft spindle 3 in the accommodating space. The main shaft spindle 3 includes an accommodating space therein, and accommodates the hydraulic cylinder 10 in the accommodating space. A cylindrical rotary joint 13 is slidably fitted between an inner periphery of the main shaft spindle 3 and an outer surface of the cylinder case 14.

The rotary joint 13 is a joint that allows supplying pressure oil to the cylinder case 14 from outside during rotation without leaking, and is coupled to a rear portion of the housing 2 by bolts (not shown). Paths 13a, 13b, which are configured to supply and discharge pressure oil to and from the hydraulic cylinder 10, are provided at a rear portion of the rotary joint 13, and pressure oil supply pipes P are connected to an outer periphery thereof as indicated by broken lines via a pipe joint. The pressure oil is supplied from a pump to one of the paths 13a, 13b via a switching valve (not shown) through one of the pressure oil supply pipes P. The pressure oil is discharged to the other one of the paths 13a, 13b toward a tank via a switching valve (not shown) through the other of pressure oil supply pipes P.

Path connection from the rotary joint 13 to the cylinder case 14 is performed via a plunger 13d and an end surface contact member 13e. That is, a spring 13c and the plunger 13d are inserted into an inner periphery of the rotary joint 13 in order from rear to front, and the plunger 13d is urged forward by the spring 13c. The end surface contact member 13e arranged in front of the plunger 13d comes into end surface contact with the plunger 13d when the plunger 13d is urged forward, and is pressed against a rear end of the cylinder case 14. The plunger 13d and the end surface contact member 13e are in end surface contact with each other to seal a space therebetween. The pressure oil from the pump is supplied to internal paths of the plunger 13d and the end surface contact member 13e in a state where the end surface contact member 13e is rotating. The pressure oil from the pump is supplied into the internal paths even when the main shaft spindle 3 is rotating. The plunger 13d and the end surface contact member 13e constitute a first port 14c that allows pressure oil to flow during rotation of the main shaft spindle 3. The first port 14c corresponds to first and second supply and discharge ports of the present invention.

Path connection from the cylinder case 14 to the rotary joint 13 is performed via an annular groove 13f provided in the inner periphery of the rotary joint 13 and a radial direction pass hole provided in the cylinder case 14 (a portion of a rear axial direction path to be described below). Oil discharged from the hydraulic cylinder 10 is supplied to the pass hole and the annular groove 13f. The supply of the discharged oil to the pass hole and the annular groove 13f is performed when the main shaft spindle 3 is stopped. The pass hole and the annular groove 13f are provided at the same position in an axial direction of the main shaft spindle 3. A seal member that seals a gap between the rotary joint 13 and the cylinder case 14 is arranged on two sides of the annular groove 13f in the axial direction of the main shaft spindle 3. The annular groove 13f constitutes a second port 14d that allows discharged oil to flow while the main shaft spindle 3 is stopped. The second port 14d corresponds to third and fourth supply and discharge ports of the present invention.

The main shaft spindle 3 is a rotating shaft that is rotatably accommodated in the accommodating space of the housing 2. A rotor 3r is fixed to an outer periphery of the main shaft spindle 3. A rotor 3r and a stator 2s fixed to an inner periphery of the housing 2 construct a built-in motor. The built-in motor drives the main shaft spindle 3 and the hydraulic cylinder 10 to rotate integrally.

The hydraulic cylinder 10 is a fluid pressure cylinder that uses the pressure oil as a working fluid, and includes: the cylinder case 14; and the piston 15 that is inserted into an internal space of the cylinder case 14 so as to be able to move forward and backward in the axial direction. The piston 15 divides the internal space of the cylinder case 14 into a front chamber 14a located on a front side and a rear chamber 14b located on a rear side in the axial direction. The piston 15 moves backward when the pressure oil is supplied to the front chamber 14a, and moves forward when the pressure oil is supplied to the rear chamber 14b. A push rod 15a extends forward at an axial center of the piston 15. The push rod 15a is inserted through a central opening 14K of the cylinder case 14 and is coupled to a wedge plunger 32 of the chuck 30.

As shown in FIGS. 1 to 3, the cylinder case 14 includes: the central opening 14K; a first main path 141; a first front chamber path 142; a first rear chamber path 143; a second main path 144; a second front chamber path 145; and a second rear chamber path 146. The central opening 14K is opened in the front end surface 140 of the cylinder case 14 at an axial center thereof. A front portion of the cylinder case 14 has a cylindrical shape. The push rod 15a is inserted into the central opening 14K. The cylinder case 14 includes a cylindrical large diameter front portion located on a front side, a rod-shaped small diameter rear portion located on a rear side, and a disc-shaped enlarged diameter portion that connects the front portion and the rear portion. The first main path 141 extends in the axial direction as a whole between front and rear ends of the cylinder case 14. Specifically, the first main path 141 includes: a front axial direction path extending in the axial direction at the front portion of the cylinder case 14; a rear axial direction path extending in the axial direction at the rear portion of the cylinder case 14; and a radial direction path extending in the radial direction at the enlarged diameter portion of the cylinder case 14 to communicate the axial direction paths that are located at different radial direction positions. The first main path 141 is a path that allows the pressure oil to flow between a first main path hole 140a opened in the cylinder case front end surface 140 and the first port 14c provided in a rear end surface. The cylinder case front end surface 140 corresponds to an end surface of the present invention. The first main path 141 corresponds to a first supply and discharge path and a second supply and discharge path of the present invention.

The first front chamber path 142 includes an axial direction path extending rearward in the axial direction from a first front chamber path hole 140b, which is opened in the cylinder case front end surface 140 at a 1 o'clock position when the first main path hole 140a is located at a 12 o'clock position, and a radial direction path extending radially outward from the front chamber 14a and communicating with the axial direction path. The first front chamber path 142 is a path that allows the pressure oil to flow between the first front chamber path hole 140b opened in the cylinder case front end surface 140 and the front chamber 14a.

The first rear chamber path 143 includes an axial direction path extending rearward in the axial direction from a first rear chamber path hole 140d, which is opened in the cylinder case front end surface 140 at an 8 o'clock position, and a radial direction path extending radially outward from the rear chamber 14b and communicating with the axial direction path. The first rear chamber path 143 is a path that allows the pressure oil to flow between the first rear chamber path hole 140d opened in the cylinder case front end surface 140 and the rear chamber 14b.

The second main path 144 extends in the axial direction as a whole between the front and rear ends of the cylinder case 14. Specifically, the second main path 144 includes: a front axial direction path portion extending in the axial direction between inner and outer peripheries of the cylindrical large diameter front portion of the cylinder case 14; a rear axial direction path extending in the axial direction in the vicinity of an axial center of the small diameter rear portion; and a radial direction path located at the enlarged diameter portion to communicate the axial direction paths which are located at different radial direction positions. The second main path 144 is a path that allows the pressure oil to flow between the second main path hole 140c opened in the cylinder case front end surface 140 at a 6 o'clock position and the second port 14d located in a rear side surface. The second main path 144 corresponds to a third supply and discharge path and a fourth supply and discharge path of the present invention.

The second front chamber path 145 includes an axial direction path extending rearward in the axial direction from the second front chamber path hole 140h, which is opened in the cylinder case front end surface 140 at a 7 o'clock position, and a radial direction path extending radially outward from the front chamber 14a and communicating with the axial direction path. The second front chamber path 145 is a path that allows the pressure oil to flow between the second front chamber path hole 140h opened in the cylinder case front end surface 140 and the rear chamber 14a.

The second rear chamber path 146 includes a second rear chamber path hole 140f opened in the cylinder case front end surface 140 at a 2 o'clock position, and is constituted by an axial direction path portion, which extends rearward in the axial direction from the second rear chamber path hole 140f, and a radial direction path portion, which extends radially outward from the rear chamber 14b and communicates with the axial direction path portion. The second rear chamber path 146 is a path that allows the pressure oil to flow between the second rear chamber path hole 140f opened in the cylinder case front end surface 140 and the rear chamber 14b.

That is, as shown in FIG. 3, the first main path hole 140a, the first front chamber path hole 140b, the second rear chamber path hole 140f, the second main path hole 140c, the second front chamber path hole 140h, and the first rear chamber path hole 140d are opened in the cylinder case front end surface 140 on a circumference of a circle having a radius R from an axial center. When the first main path hole 140a is located at the 12 o'clock position, the first front chamber path hole 140b is arranged at the 1 o'clock position, the second rear chamber path hole 140f is arranged at the 2 o'clock position, the second main path hole 140c is arranged at the 6 o'clock position, the second front chamber path hole 140h is arranged at the 7 o'clock position, and the first rear chamber path hole 140d is arranged at the 8 o'clock position.

The manifold block 20 is a path switching member that switches paths through which the pressure oil flows and is attached and fixed to a member including the cylinder case 14 (specifically, the main shaft spindle 3) with an abutting surface 200 being abutted against the cylinder case front end surface 140. As shown in FIG. 4, the manifold block 20 is a disc-shaped block body that matches a shape of the cylinder case front end surface 140 and includes a central opening 20K that allows the push rod 15a to be inserted into a center thereof. The manifold block 20 is provided with a plurality of manifold holes opened in the manifold block abutting surface 200 that is a rear end surface. Specifically, first to fourth manifold holes 20a to 20d are arranged on the same circumference of the circle having the radius R, which is larger than a radius of the central opening 20K, from an axial center of the disc-shaped manifold block 20. The first to fourth manifold holes 20a to 20d are pressure oil paths extending forward in the axial direction from the manifold block abutting surface 200 to a thickness central portion.

Among the first to fourth manifold holes 20a to 20d, when the first manifold hole 20a is located at the 12 o'clock position as viewed from the axial center of the manifold block 20, the second manifold hole 20b is arranged at the 1 o'clock position, the third manifold hole 20c is arranged at the 6 o'clock position, and the fourth manifold hole 20d is arranged at the 8 o'clock position.

The first manifold hole 20a and the second manifold hole 20b communicate with each other via a first intermediate path 20P extending in a direction intersecting the axial direction inside the manifold block 20. Similarly, the third manifold hole 20c and the fourth manifold hole 20d communicate with each other via a second intermediate path 20Q extending in the direction intersecting the axial direction inside the manifold block 20.

The outer diameter gripping chuck 30 is a known cam type chuck that includes three or more claws (three claws 34 in the present embodiment). Each of the claws is interlocked and movable in the radial direction to grip a workpiece on an outer diameter side or to grip a cylindrical workpiece on an inner diameter side. As shown in FIG. 1, the chuck 30 includes a body 31, the wedge plunger 32, a master jaw 33, and the three claws 34. The wedge plunger 32 and the master jaw 33 are meshed with each other by protrusions and grooves having T-shaped cross sections inclined with respect to a rotation center of the body 31. The protrusions and grooves constitute a cam that converts axial direction movement into radial direction movement. The chuck 30 opens and closes the plurality of (three) claws 34, which are arranged around the central axis, in the radial direction along with forward and backward movement of the wedge plunger 32. The wedge plunger 32 corresponds to an "operation body capable of moving forward and backward along an axial direction of a central axis" in the present invention. The inner diameter gripping chuck 30B has the same configuration as that of the outer diameter gripping chuck 30A except that shapes of the claws 34 are different.

In the outer diameter gripping chuck 30A shown in FIG. 1, when the wedge plunger 32 is pulled rearward (rightward in FIG. 1), the master jaw 33 is pulled toward a center, the claws 34 are moved radially inward, and an outer diameter of the workpiece W is gripped, that is, clamped by the claws 34. On the other hand, when the wedge plunger 32 is pushed forward, the master jaw 33 is pushed outward from the center, the claws 34 are moved radially outward, and the gripping of the outer diameter of the workpiece W performed by the claws 34 is released, that is, unclamped.

On the other hand, in the inner diameter gripping chuck 30B shown in FIG. 8, when the wedge plunger 32 is pushed forward (leftward in FIG. 1), the master jaw 33 is pushed outward from the center, the claws 34 are moved radially outward, and an inner diameter of the workpiece W is gripped, that is, clamped by the claws 34. On the other hand, when the wedge plunger 32 is pulled rearward, the master jaw 33 is pulled toward the center, the claws 34 are moved radially inward, and the gripping of the inner diameter of the workpiece W performed by the claws 34 is released, that is, unclamped.

(2. Flow of Pressure Oil and Operations of Each Part when Outer Diameter Gripping Chuck is Used)

Figure 5:
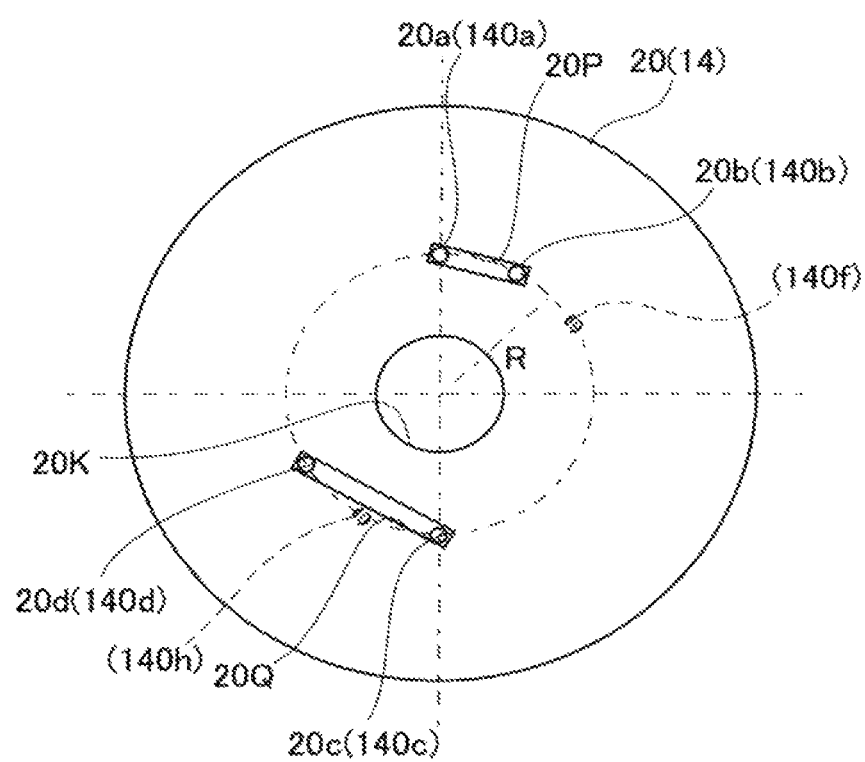
FIG. 5 is a cross-sectional view showing a positional relationship between holes of the manifold block and the cylinder case when the outer diameter gripping chuck is used.
Figure 6:
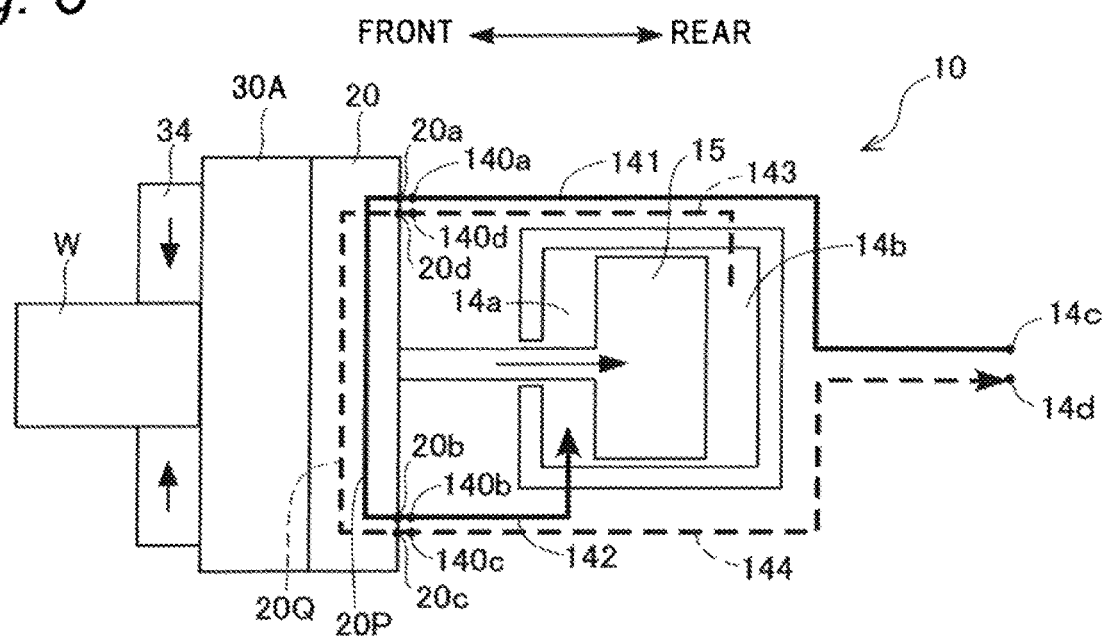
FIG. 6 is a schematic view showing a flow of pressure oil during clamping of the outer diameter gripping chuck.
Figure 7:
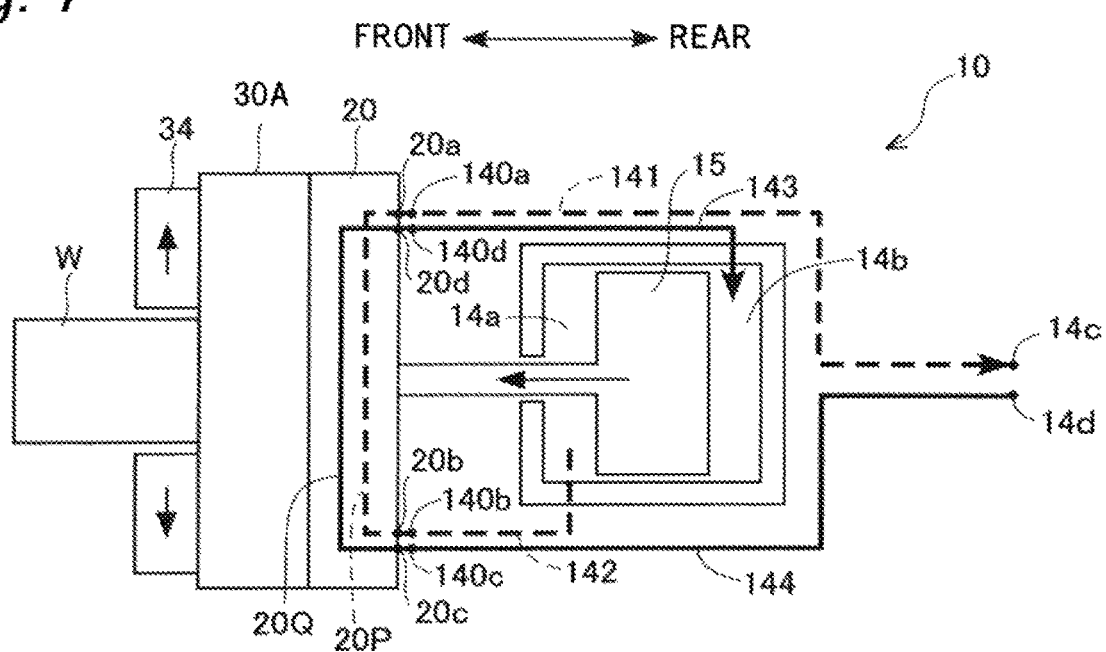
FIG. 7 is a schematic view showing the flow of the pressure oil during unclamping of the outer diameter gripping chuck of the embodiment.

Next, a flow of the pressure oil and operations of each part when the outer diameter gripping chuck 30A is used will be described with reference to FIGS. 5 to 7. FIG. 5 is a cross-sectional view showing a positional relationship between the holes of the manifold block 20 and the cylinder case 14 when the outer diameter gripping chuck 30A is used. FIG. 6 is a schematic view showing the flow of the pressure oil during clamping of the outer diameter gripping chuck 30A, and FIG. 7 is a schematic view showing the flow of the pressure oil during unclamping. A flow on a pressure oil supply side is indicated by a solid line arrow while a flow on a pressure oil discharge side is indicated by a broken line arrow.

When the outer diameter gripping chuck 30A is used, the manifold block 20 is attached to a front end of the main shaft spindle 3 in a first phase, as shown in FIG. 5. That is, when the outer diameter gripping chuck 30A is used, the manifold block 20 is fastened and fixed to the front end of the main shaft spindle 3 by bolts with the manifold block abutting surface 200 being abutted against the cylinder case front end surface 140 in the first phase in which the first manifold hole 20a and the first main path hole 140a are aligned. In the first phase, the first manifold hole 20a and the first main path hole 140a, the second manifold hole 20b and the first front chamber path hole 140b, the third manifold hole 20c and the second main path hole 140c, and the fourth manifold hole 20d and the first rear chamber path hole 140d are aligned and communicated with each other, respectively.

On the other hand, the second rear chamber path hole 140f and the second front chamber path hole 140h of the cylinder case 14 are not aligned with any one of the manifold holes of the manifold block 20, and are closed by the manifold block abutting surface 200. In FIG. 5, the path holes of the cylinder case 14 (the second rear chamber path hole 140f and the second front chamber path hole 140h), which does not communicate with any one of the manifold holes of the manifold block 20, are hatched in the first phase.

When the outer diameter of the workpiece W is clamped by the chuck 30A, during rotation or stopping of the main shaft spindle 3, the pressure oil supplied from the pump is supplied from the first port 14c located at the rear end of the cylinder case 14 to the first main path 141 via the rotary joint 13, guided forward, and flows into the first manifold hole 20a of the manifold block 20 via the first main path hole 140a, as indicated by the solid line arrow in FIG. 6. The pressure oil flowing into the first manifold hole 20a flows in the first intermediate path 20P, and flows into the first front chamber path hole 140b of the cylinder case 14 via the second manifold hole 20b. The pressure oil flowing into the first front chamber path hole 140b flows into the front chamber 14a via the first front chamber path 142, and the piston 15 is pushed rearward and moved backward.

Along with the backward movement of the piston 15, the pressure oil in the rear chamber 14b flows out to the first rear chamber path 143 and is guided forward, and then flows into the fourth manifold hole 20d of the manifold block 20 via the first rear chamber path hole 140d, as indicated by the broken line arrow in FIG. 6. The pressure oil flowing into the fourth manifold hole 20d flows in the second intermediate path 20Q and flows into the second main path hole 140c of the cylinder case 14 via the third manifold hole 20c. The pressure oil flowing into the second main path hole 140c is guided rearward by the second main path 144, and is discharged from the second port 14d to outside of the device.

The push rod 15a that is integral with the piston 15 is moved backward, so that the wedge plunger 32 of the chuck 30A is pulled rearward to pull the master jaw 33 toward the center, and the outer diameter of the workpiece W is gripped by the claws 34.

On the other hand, when the workpiece W is unclamped, during stopping of the main shaft spindle 3, the pressure oil supplied from the pump via the switching valve is supplied to the second main path 144 via the second port 14d located at the rear end of the cylinder case 14, guided forward, and flows into the third manifold hole 20c of the manifold block 20 via the second main path hole 140c, as indicated by the solid line arrow in FIG. 7. The pressure oil flowing into the third manifold hole 20c flows in the second intermediate path 20Q and flows into the first rear chamber path hole 140d of the cylinder case 14 via the fourth manifold hole 20d. The pressure oil flowing into the first rear chamber path hole 140d flows into the rear chamber 14b via the first rear chamber path 143, and the piston 15 is pushed forward and moved forward. Since the pressure oil is supplied to the second port 14d while the main shaft spindle 3 is stopped, the pressure oil is unlikely to leak from the second port 14d to the outside via the seal member.

Along with the forward movement of the piston 15, the pressure oil in the front chamber 14a flows out to the first front chamber path 142 and is guided forward, and then flows into the second manifold hole 20b of the manifold block 20 via the first front chamber path hole 140b, as indicated by the broken line arrow in FIG. 7. The pressure oil flowing into the second manifold hole 20b flows in the first intermediate path 20P, and flows into the first main path hole 140a of the cylinder case 14 via the first manifold hole 20a. The pressure oil flowing into the first main path hole 140a is guided rearward by the first main path 141, and is discharged from the first port 14c to the tank via the rotary joint 13 via the switching valve outside the device.

The push rod 15a which is integral with the piston 15 is moved forward, so that the wedge plunger 32 of the chuck 30A is pushed forward to move the master jaw 33 in an outer peripheral direction, and the gripping of the outer diameter of the workpiece W performed by the claws 34 is released.

(3. Flow of Pressure Oil and Operations of Each Part when Inner Diameter Gripping Chuck is Used)

Figure 9:
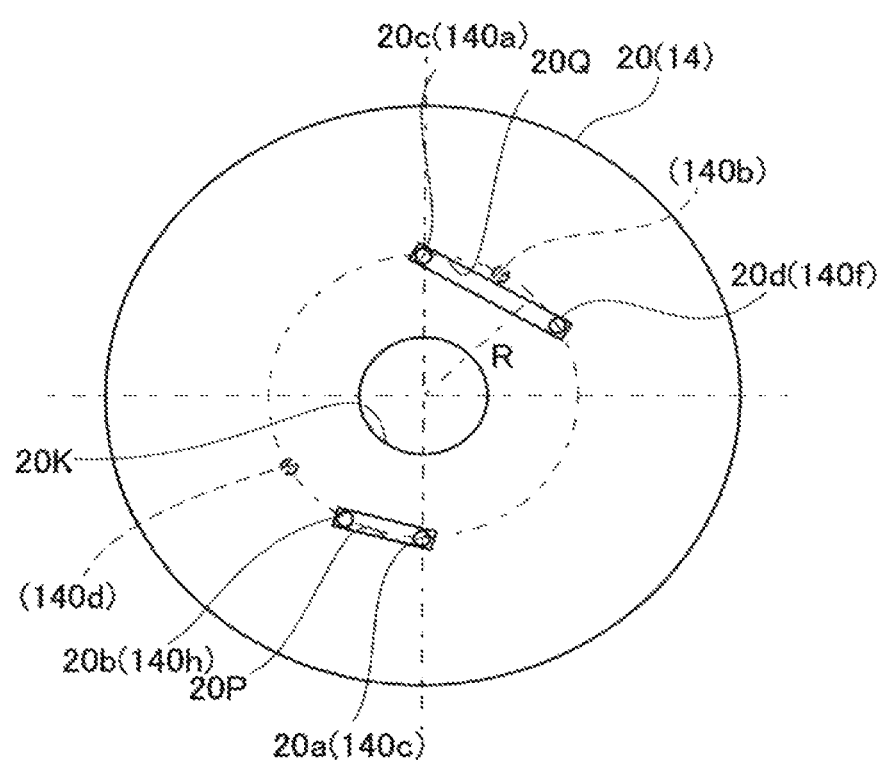
FIG. 9 is a cross-sectional view showing the positional relationship between holes of the manifold block and the cylinder case when the inner diameter gripping chuck is used.
Figure 10:
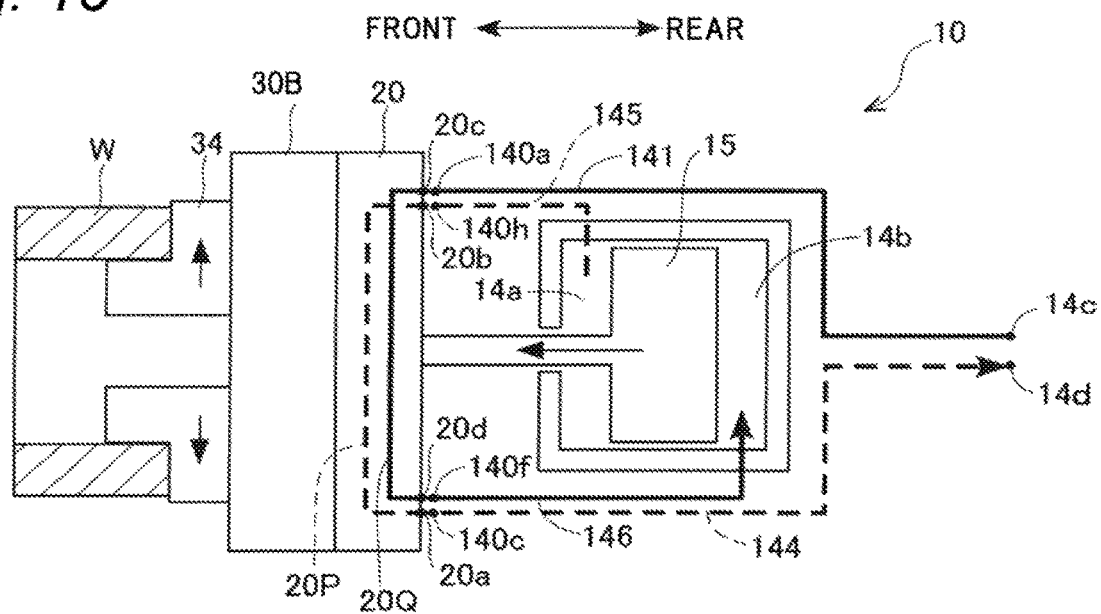
FIG. 10 is a schematic view showing the flow of the pressure oil during clamping of the inner diameter gripping chuck of the embodiment.
Figure 11:
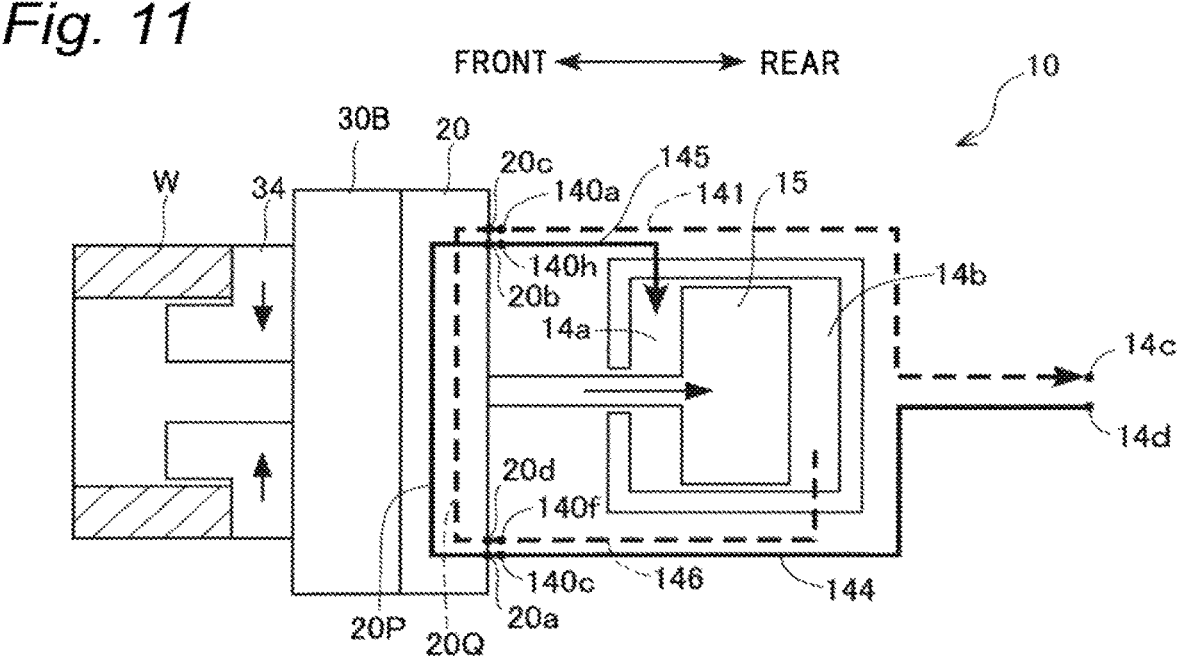
FIG. 11 is a schematic view showing the flow of the pressure oil during unclamping of the inner diameter gripping chuck of the embodiment.

Next, the flow of the pressure oil and the operations of each part when the inner diameter gripping chuck is used will be described with reference to FIGS. 8 to 11. FIG. 9 is a cross-sectional view showing the positional relationship between the holes of the manifold block 20 and the cylinder case 14 when the inner diameter gripping chuck 30B is used. FIG. 10 is a schematic view showing the flow of the pressure oil during clamping of the inner diameter gripping chuck 30B, and FIG. 11 is a schematic view showing the flow of the pressure oil during unclamping. The flow on the pressure oil supply side is indicated by the solid line arrow while the flow on the pressure oil discharge side is indicated by the broken line arrow.

When the inner diameter gripping chuck 30B is used, the manifold block 20 is attached to the front end of the main shaft spindle 3 in a second phase that is 180° out of phase around the central axis with respect to the first phase when the outer diameter gripping chuck 30A is used. That is, when the inner diameter gripping chuck 30B is used, as shown in FIG. 9, the manifold block 20 is fastened and fixed to the front end of the main shaft spindle 3 by bolts with the manifold block abutting surface 200 being abutted against the cylinder case front end surface 140 in the second phase in which the third manifold hole 20c and the first main path hole 140a are aligned. In the second phase, the third manifold hole 20c and the first main path hole 140a, the fourth manifold hole 20d and the second rear chamber path hole 140f, the first manifold hole 20a and the second main path hole 140c, and the second manifold hole 20b and the second front chamber path hole 140h are aligned and communicated with each other, respectively.

On the other hand, the first front chamber path hole 140b and the first rear chamber path hole 140d of the cylinder case 14 are not aligned with any one of the manifold holes of the manifold block 20, and are closed by the manifold block abutting surface 200. In FIG. 9, the path holes of the cylinder case 14 (the first front chamber path hole 140b and the first rear chamber path hole 140d), which does not communicate with any one of the manifold holes the manifold block 20, are hatched in the second phase.

When the inner diameter of the workpiece W is clamped by the chuck 30B, during rotation or stopping of the main shaft spindle 3, the pressure oil supplied from the pump via the switching valve is supplied from the first port 14c located at the rear end of the cylinder case 14 to the first main path 141 via the rotary joint 13, guided forward, and flows into the third manifold hole 20c of the manifold block 20 via the first main path hole 140a, as indicated by the solid line arrow in FIG. 10. The pressure oil flowing into the third manifold hole 20c flows in the second intermediate path 20Q and flows into the second rear chamber path hole 140f of the cylinder case 14 via the fourth manifold hole 20d. The pressure oil flowing into the second rear chamber path hole 140f flows into the rear chamber 14b via the second rear chamber path 146, and the piston 15 is pushed forward and moved forward.

Along with the forward movement of the piston 15, the pressure oil in the front chamber 14a flows out to the second front chamber path 145 and is guided forward, and then flows into the second manifold hole 20b of the manifold block 20 via the second front chamber path hole 140h, as indicated by the broken line arrow in FIG. 10. The pressure oil flowing into the second manifold hole 20b flows in the first intermediate path 20P, and flows into the second main path hole 140c of the cylinder case 14 via the first manifold hole 20a. The pressure oil flowing into the second main path hole 140c is guided rearward by the second main path 144, and is discharged from the second port 14d to the tank via the switching valve outside the device.

The push rod 15a which is integral with the piston 15 is moved forward, so that the wedge plunger 32 of the chuck 30 is pushed forward to move the master jaw 33 in the outer peripheral direction, and the inner diameter of the workpiece W is gripped by the claws 34.

On the other hand, when the workpiece W is unclamped, during stopping of the main shaft spindle 3, the pressure oil supplied from the pump via the switching valve is supplied to the second main path 144 via the second port 14d located at the rear end of the cylinder case 14, guided forward, and flows into the first manifold hole 20a of the manifold block 20 via the second main path hole 140c, as indicated by the solid line arrow in FIG. 11. The pressure oil flowing into the first manifold hole 20a flows in the first intermediate path 20P, and flows into the second front chamber path hole 140h of the cylinder case 14 via the second manifold hole 20b.

The pressure oil flowing into the second front chamber path hole 140h flows into the front chamber 14a via the second front chamber path 145, and the piston 15 is pushed rearward and moved backward.

Along with the backward movement of the piston 15, the pressure oil in the rear chamber 14b flows out to the second rear chamber path 146 and is guided forward, and then flows into the fourth manifold hole 20d of the manifold block 20 via the second rear chamber path hole 140f, as indicated by the broken line arrow in FIG. 11. The pressure oil flowing into the fourth manifold hole 20d flows in the second intermediate path 20Q and flows into the first main path hole 140a of the cylinder case 14 via the third manifold hole 20c. The pressure oil flowing into the first main path hole 140a is guided rearward by the first main path 141, and is discharged from the first port 14c to the tank via the rotary joint 13 via the switching valve outside the device.

The push rod 15a which is integral with the piston 15 is moved backward, so that the wedge plunger 32 of the chuck 30 is pulled rearward to pull the master jaw 33 toward the center, and the gripping of the inner diameter of the workpiece W performed by the claws 34 is released.

(4. Conclusion)

As described above, in the workpiece gripping device 1 according to the present embodiment, the cylinder case 14 includes: the first main path 141 that communicates the first port 14c for supplying and discharging the pressure oil with the cylinder case front end surface 140; the second main path 144 that communicates the second port 14d for supplying and discharging the pressure oil with the cylinder case front end surface 140; the first and second front chamber paths 142, 145 that communicate the front chamber 14a with the cylinder case front end surface 140; and the first and second rear chamber paths 143, 146 that communicate the rear chamber 14b with the front end surface 140.

The workpiece gripping device 1 further includes the manifold block 20, which is a block body whose manifold block abutting surface 200 is abutted against the cylinder case front end surface 140. The block body is attached and fixed to the cylinder case 14 such that the relative position of the manifold block abutting surface 200 with respect to the cylinder case front end surface 140 can be selected from the first phase (first position of the present invention) and the second phase (second position of the present invention). The manifold block 20 includes the first and second intermediate paths 20P, 20Q configured to communicate pairs of the manifold holes (the first manifold hole 20a and the second manifold hole 20b, and the third manifold hole 20c and the fourth manifold hole 20d) opened in the manifold block abutting surface 200 with each other (see FIG. 4).

When the outer diameter gripping chuck 30A is used, the manifold block 20 is attached and fixed to the cylinder case 14 in the first phase shown in FIG. 5. At this time, the first main path 141 communicates with the first front chamber path 142 via the first intermediate path 20P, and the first rear chamber path 143 communicates with the second main path 144 via the second intermediate path 20Q. In this state, as shown in FIG. 6, when the pressure oil is supplied from the first port 14c to the first main path 141, the pressure oil flows into the front chamber 14a via the first intermediate path 20P and the first front chamber path 142, and the piston 15 is moved backward. At this time, the pressure oil flows from the rear chamber 14b into the first rear chamber path 143 due to the backward movement of the piston 15, and is discharged from the second port 14d via the second intermediate path 20Q and the second main path 144. That is, by moving the wedge plunger 32 of the chuck 30A backward by driving of the backward movement of the piston 15, the claws 34 are moved radially inward to grip (clamp) the outer diameter of the workpiece W.

On the other hand, as shown in FIG. 7, when the pressure oil is supplied from the second port 14*d* to the second main path 144, the pressure oil flows into the rear chamber 14*b* via the second intermediate path 20Q and the first rear chamber path 143, and the piston 15 is moved forward. At this time, the pressure oil flows from the front chamber 14*a* into the first front chamber path 142 due to the forward movement of the piston 15, and is discharged from the first port 14*c* via the first intermediate path 20P and the first main path 141. That is, by moving the wedge plunger 32 of the chuck 30A forward by driving of the forward movement of the piston 15, the claws 34 are moved radially outward to release the gripping of (unclamp) the outer diameter of the workpiece W performed by the claws 34.

When the inner diameter gripping chuck 30B is used, the manifold block 20 is attached and fixed to the cylinder case 14 in the second phase shown in FIG. 9. At this time, the first main path 141 communicates with the second rear chamber path 146 via the second intermediate path 20Q, and the second front chamber path 145 communicates with the second main path 144 via the first intermediate path 20P. In this state, as shown in FIG. 10, when the pressure oil is supplied from the first port 14*c* to the first main path 141, the pressure oil flows into the rear chamber 14*b* via the second intermediate path 20Q and the second rear chamber path 146, and the piston 15 is moved forward. At this time, the pressure oil flows from the front chamber 14*a* into the second front chamber path 145 due to the forward movement of the piston 15, and is discharged from the second port 14*d* via the first intermediate path 20P and the second main path 144. That is, by moving the wedge plunger 32 of the chuck 30B forward by the driving of the forward movement of the piston 15, the claws 34 are moved radially outward to grip (clamp) the inner diameter of the workpiece W.

On the other hand, as shown in FIG. 11, when the pressure oil is supplied from the second port 14*d* to the second main path 144, the pressure oil flows into the front chamber 14*a* via the first intermediate path 20P and the second front chamber path 145, and the piston 15 is moved backward. At this time, the pressure oil flows from the rear chamber 14*b* into the second rear chamber path 146 due to the backward movement of the piston 15, and is discharged from the first port 14*c* via the second intermediate path 20Q and the first main path 141. That is, by moving the wedge plunger 32 of the chuck 30B backward by the driving of the backward movement of the piston 15, the claws 34 are moved radially inward to release the gripping of (unclamp) the inner diameter of the workpiece W performed by the claws 34.

As described above, the workpiece gripping device 1 allows easily switching between pressure oil paths for the use of the outer diameter gripping chuck 30A and pressure oil paths for the used of the inner diameter gripping chuck 30B simply by changing an attachment position of the manifold block 20 to the cylinder case 14 between the first phase and the second phase without performing component replacement of the cylinder case 14 or the like.

According to the present embodiment, as shown in FIG. 3, the first main path hole 140*a* serving as an end portion of the first main path 141, the second main path hole 140*c* serving as an end portion of the second main path 144, the first and second front chamber path holes 140*b*, 140*h* serving as end portions of the first and second front chamber paths 142, 145, and the first and second rear chamber path holes 140*d*, 140*f* serving as end portions of the first and second rear chamber paths 143, 146 are opened in the front end surface 140 of the cylinder case 14.

As shown in FIG. 4, the first and second manifold holes 20*a*, 20*b* communicating with the first intermediate path 20P, and the third and fourth manifold holes 20*c*, 20*d* communicating with the second intermediate path 20Q are opened in the abutting surface 200 of the manifold block 20.

When the manifold block 20 is in the first phase, as shown in FIGS. 5 to 7, the first main path hole 140*a* and the first manifold hole 20*a* are aligned, and the first front chamber path hole 140*b* and the second manifold hole 20*b* are aligned such that the first main path 141, the first intermediate path 20P, and the first front chamber path 142 communicate with each other, and a pressure oil supply path toward the front chamber 14*a* is reliably formed to supply the pressure oil so as to drive the piston to a pulling side during clamping of the outer diameter gripping chuck 30A. Moreover, the first rear chamber path hole 140*d* and the fourth manifold hole 20*d* are aligned, and the second main path hole 140*c* and the third manifold hole 20*c* are aligned such that the first rear chamber path 143, the second intermediate path 20Q, and the second main path 144 communicate with each other, and a pressure oil supply path toward the rear chamber 14*b* is reliably formed to supply the pressure oil so as to drive the piston 15 to a pushing side during unclamping of the outer diameter gripping chuck 30A.

When the manifold block 20 is in the second phase, as shown in FIGS. 9 to 11, the first main path hole 140*a* and the third manifold hole 20*c* are aligned, and the second rear chamber path hole 140*f* and the fourth manifold hole 20*d* are aligned such that the first main path 141, the second intermediate path 20Q, and the second rear chamber path 146 communicate with each other, and the pressure oil supply path toward the rear chamber 14*b* is reliably formed to supply the pressure oil so as to drive the piston 15 to the pushing side during clamping of the inner diameter gripping chuck 30B. Moreover, the second front chamber path hole 140*h* and the second manifold hole 20*b* are aligned, and the second main path hole 140*c* and the first manifold hole 20*a* are aligned such that the second rear chamber path 145, the first intermediate path 20P, and the second main path 144 communicate with each other, and the pressure oil supply path toward the front chamber 14*a* is reliably formed to supply the pressure oil so as to drive the piston 15 to the pulling side during unclamping of the inner diameter gripping chuck 30B.

As described above, the path holes of the cylinder case 14 are aligned with the manifold holes of the manifold block 20 in an appropriate combination simply by changing attachment of the manifold block 20 to the cylinder case 14 between the first phase and the second phase. Therefore, the workpiece gripping device 1 allows easily switching between the pressure oil paths for the use of the outer diameter gripping chuck 30A and the pressure oil paths for the use of the inner diameter gripping chuck 30B.

According to the present embodiment, the hydraulic cylinder 10 is rotatable around the central axis in the housing 2, the first port 14*c* is arranged on the central axis of the main shaft spindle 3. The plunger 13*d* and the end surface contact member 13*e* constituting the first port 14*c* are in end surface contact with each other, allowing the pressure oil to be supplied to the first main path 141 via the plunger 13*d* and the end surface contact member 13*e* without leaking to the outside even when the hydraulic cylinder 10 is being rotated integrally with the main shaft spindle 3 by the built-in motor. The end surface contact member 13*e* located on the central axis of the main shaft spindle 3 has small whirling, maintaining good end surface contact between the plunger 13*d* and the end surface contact member 13*e*.

According to the present embodiment, the path holes 140*a* to 140*d*, 140*f*, and 140*h* are provided in the front end surface 140 of the cylinder case 14. The manifold block 20 includes the central opening 20K through which the push rod 15*a* extending from the piston 15 toward the chuck 30 is inserted, is coaxially arranged between the chuck 30 and the cylinder case 14, and is attached to the front end surface 140 of the cylinder case 14. This allows the manifold block 20 to be attached to the cylinder case 14 without increasing a size of the entire device.

According to the present embodiment, the cylinder case 14 and the manifold block 20 are coaxially arranged. The first and second main path holes 140*a*, 140*c*, the first and second front chamber path holes 140*b*, 140*h*, and the first and second rear chamber path holes 140*d*, 140*f* are arranged on the circumference of the circle having the predetermined radius R from the center of the front end surface 140 of the cylinder case 14 such that positions thereof are shifted from each other. The first to fourth manifold holes 20*a* to 20*d* are arranged on the circumference of the circle having the same radius as the predetermined radius R from the center of the manifold block abutting surface 200 such that positions thereof are shifted from each other. The first phase and the second phase differ in phase by 180° around the central axis with respect to the cylinder case 14. Then, shifting the phase by 180° around the central axis between the first phase and the second phase changes a combination of the manifold holes and the path holes which are aligned with each other, easily switching between the pressure oil paths for use of the outer diameter gripping chuck 30A and the pressure oil paths for use of the inner diameter gripping chuck 30B.

(5. First Modification)

Figure 12:
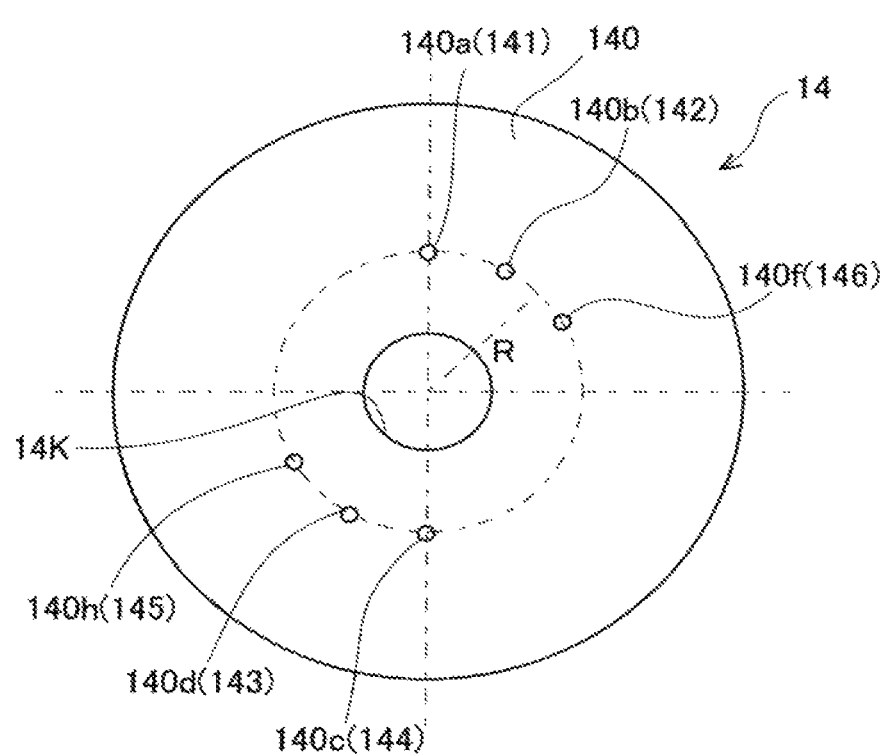
FIG. 12 is a front view of a front end surface of a cylinder case according to a first modification.
Figure 13:
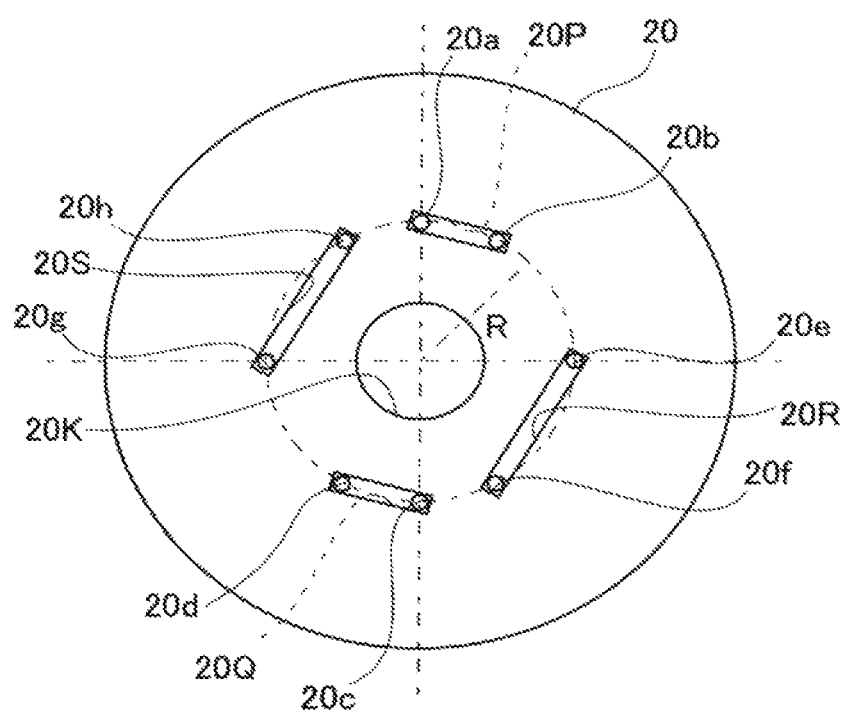
FIG. 13 is a cross-sectional view corresponding to FIG. 4 showing a manifold block according to the first modification.
Figure 14:
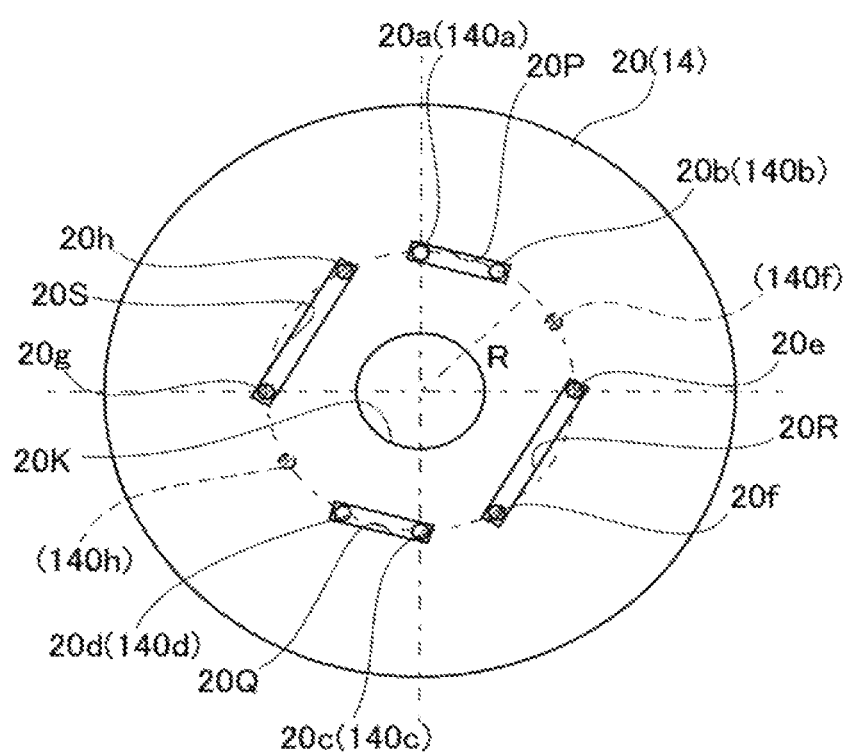
FIG. 14 is a cross-sectional view showing a positional relationship between holes of the manifold block and the cylinder case when the outer diameter gripping chuck is used in the first modification.
Figure 15:
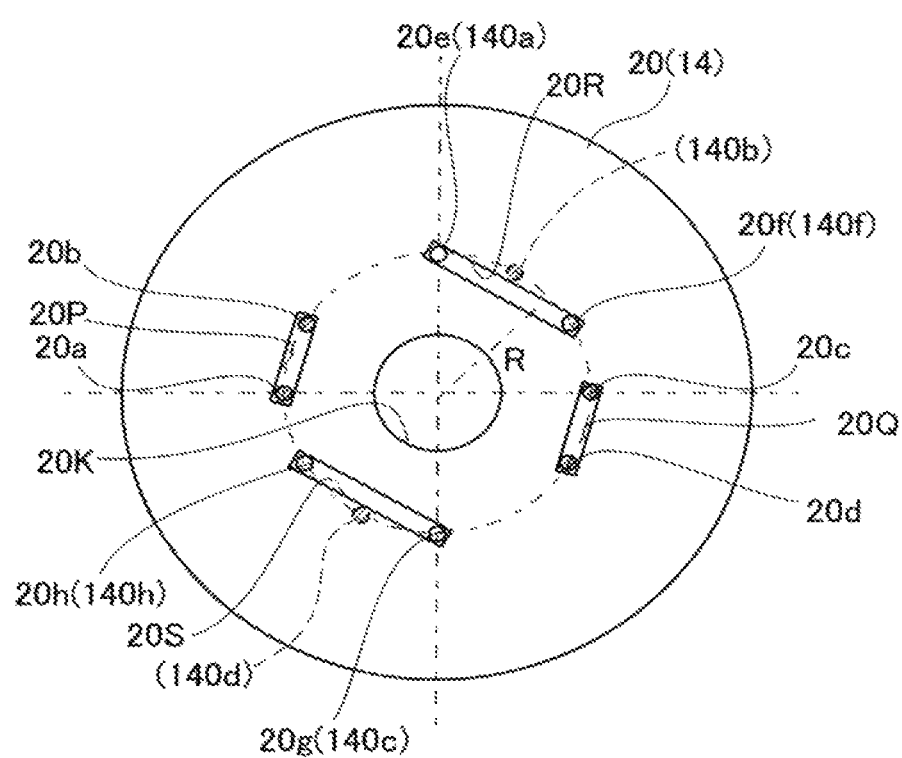
FIG. 15 is a cross-sectional view showing the positional relationship between the holes of the manifold block and the cylinder case when the inner diameter gripping chuck is used in the first modification.
Figure 16:
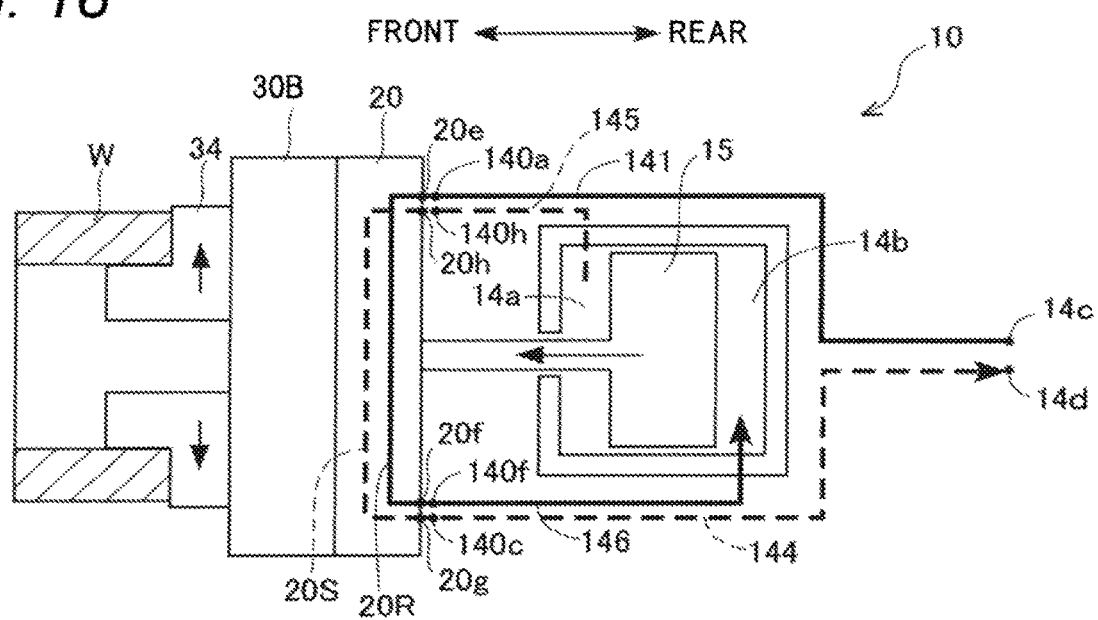
FIG. 16 is a schematic view showing a flow of pressure oil during clamping of the inner diameter gripping chuck in the first modification.
Figure 17:
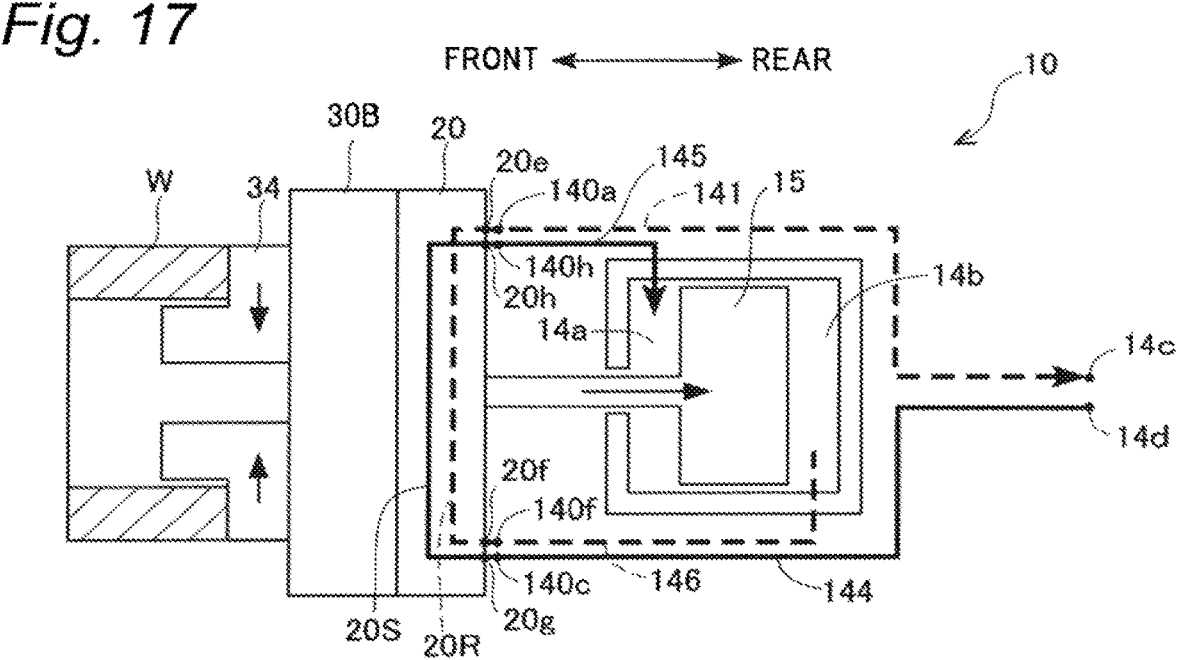
FIG. 17 is a schematic view showing the flow of the pressure oil during unclamping of the inner diameter gripping chuck in the first modification.

In the above embodiment, an example, in which the manifold block 20 includes the four manifold holes 20*a* to 20*d* and the two (first and second) intermediate paths 20P, 20Q extending in the direction intersecting the axial direction, is described. In a first modification, the manifold block 20 includes eight manifold holes and four intermediate paths extending in the direction intersecting the axial direction. Hereinafter, a configuration and operations of the first modification will be described with reference to FIGS. 12 to 17. FIG. 12 is a front view of the front end surface 140 of the cylinder case 14 according to the present modification. FIG. 13 is a cross-sectional view corresponding to FIG. 4 showing the manifold block 20 according to the present modification. FIG. 14 is a cross-sectional view showing a positional relationship between the holes of the manifold block 20 and the cylinder case 14 when the outer diameter gripping chuck 30A is used in the present modification, and FIG. 15 is a cross-sectional view showing the positional relationship between the holes of the manifold block 20 and the cylinder case 14 when the inner diameter gripping chuck 30B is used. FIG. 16 is a schematic view showing the flow of the pressure oil during clamping of the inner diameter gripping chuck 30B in the present modification, and FIG. 17 is a schematic view showing the flow of the pressure oil during unclamping. Since the flow of the pressure oil during clamping and the flow of the pressure oil during unclamping of the outer diameter gripping chuck 30A in the present modification are the same as those in FIGS. 6 and 7, drawings thereof are omitted.

In the present modification, the cylinder case 14 includes six paths, which is common to the above embodiment, however, an arrangement of the paths is different. As shown in FIG. 12, the cylinder case 14 includes: the first main path 141 which includes the first main path hole 140*a*; the first front chamber path 142 which includes the first front chamber path hole 140*b*; the first rear chamber path 143 which includes the first rear chamber path hole 140*d*; the second main path 144 which includes the second main path hole 140*c*; the second front chamber path 145 which includes the second front chamber path hole 140*h*; and the second rear chamber path 146 which includes the second rear chamber path hole 140*f*. In the front end surface 140 of the cylinder case 14, as shown in FIG. 12, when the first main path hole 140*a* is located at the 12 o'clock position, the first front chamber path hole 140*b* is arranged at the 1 o'clock position, the second rear chamber path hole 140*f* is arranged at the 2 o'clock position, the second main path hole 140*c* is arranged at the 6 o'clock position, the first rear chamber path hole 140*d* is arranged at the 7 o'clock position, and the second front chamber path hole 140*h* is arranged at the 8 o'clock position.

In the manifold block 20 according to the first modification, as shown in FIG. 13, eight (first to eighth) manifold holes 20*a* to 20*h* are formed on the same circumference of the circle having the radius R with respect to the axial center. Among the first to eighth manifold holes 20*a* to 20*h*, when the first manifold hole 20*a* is located at the 12 o'clock position as viewed from the axial center of the manifold block 20, the second manifold hole 20*b* is arranged at the 1 o'clock position, the third manifold hole 20*c* is arranged at the 6 o'clock position, the fourth manifold hole 20*d* is arranged at the 7 o'clock position, the fifth manifold hole 20*e* is arranged at the 3 o'clock position, the sixth manifold hole 20*f* is arranged at the 5 o'clock position, the seventh manifold hole 20*g* is arranged at the 9 o'clock position, and the eighth manifold hole 20*h* is arranged at the 11 o'clock position.

The first manifold hole 20*a* and the second manifold hole 20*b* communicate with each other via the first intermediate path 20P extending in the direction intersecting the axial direction. Similarly, the third manifold hole 20*c* and the fourth manifold hole 20*d* communicate with each other via the second intermediate path 20Q. Similarly, the fifth manifold hole 20*e* and the sixth manifold hole 20*f* communicate with each other via a third intermediate path 20R. Similarly, the seventh manifold hole 20*g* and the eighth manifold hole 20*h* communicate with each other via a fourth intermediate path 20S.

When the outer diameter gripping chuck 30A is used, the manifold block 20 is fastened and fixed to the front end of the main shaft spindle 3 by bolts with the manifold block abutting surface 200 being abutted against the cylinder case front end surface 140 in the first phase in which the first manifold hole 20*a* and the first main path hole 140*a* are aligned, as shown in FIG. 14. In the first phase, the first manifold hole 20*a* and the first main path hole 140*a*, the second manifold hole 20*b* and the first front chamber path hole 140*b*, the third manifold hole 20*c* and the second main path hole 140*c*, and the fourth manifold hole 20*d* and the first rear chamber path hole 140*d* are aligned and communicated with each other, respectively.

On the other hand, the fifth manifold hole 20*e* to the eighth manifold hole 20*h* are not aligned with any one of the path holes of the cylinder case 14, and are closed by the cylinder case front end surface 140. Moreover, the second rear chamber path hole 140*f* and the second front chamber path hole 140*h* of the cylinder case 14 are not aligned with any one of the manifold holes of the manifold block 20, and are closed by the manifold block abutting surface 200. In FIG. 14, the manifold holes (the fifth manifold hole 20*e* to the eighth manifold hole 20h) which does not communicate with the path holes of the cylinder case 14 and the path holes of the cylinder case 14 (the second rear chamber path hole 140f and the second front chamber path hole 140h), which does not communicate with the manifold holes of the manifold block 20, are hatched.

The flow of the pressure oil and the operations of each part when the outer diameter of the workpiece W is clamped by the chuck 30A are the same as those in the above embodiment, and are as shown in FIG. 6, so that a detailed description thereof will be omitted. The push rod 15a which is integral with the piston 15 is moved backward, so that the wedge plunger 32 of the chuck 30A is pulled rearward to pull the master jaw 33 toward the center, and the outer diameter of the workpiece W is gripped by the claws 34. On the other hand, the flow of the pressure oil and the operations of each part when the workpiece W is unclamped are the same as those in the above embodiment, and are as shown in FIG. 7, so that a detailed description thereof will be omitted. The push rod 15a which is integral with the piston 15 is moved forward, so that the wedge plunger 32 of the chuck 30A is pushed forward to move the master jaw 33 in the outer peripheral direction, and the gripping of the outer diameter of the workpiece W performed by the claws 34 is released.

When the inner diameter gripping chuck 30B is used, the manifold block 20 is attached to the front end of the main shaft spindle 3 in the second phase that is 90° out of phase around the central axis with respect to the first phase when the outer diameter gripping chuck 30A is used. That is, when the inner diameter gripping chuck 30B is used, as shown in FIG. 15, the manifold block 20 is fastened and fixed to the front end of the main shaft spindle 3 by bolts with the manifold block abutting surface 200 being abutted against the cylinder case front end surface 140 in the second phase in which the fifth manifold hole 20e and the first main path hole 140a are aligned. In the second phase, the fifth manifold hole 20e and the first main path hole 140a, the sixth manifold hole 20f and the second rear chamber path hole 140f, the seventh manifold hole 20g and the second main path hole 140c, and the eighth manifold hole 20h and the second front chamber path hole 140h are aligned and communicated with each other, respectively.

On the other hand, the first manifold hole 20a to the fourth manifold hole 20d are not aligned with any one of the path holes of the cylinder case 14, and are closed by the front end surface 140. Moreover, the first front chamber path hole 140b and the first rear chamber path hole 140d of the cylinder case 14 are not aligned with any one of the manifold holes of the manifold block 20, and are closed by the manifold block abutting surface 200. In FIG. 15, the manifold holes (the first manifold hole 20a to the fourth manifold hole 20d) which does not communicate with the path holes of the cylinder case 14 and the path holes of the cylinder case 14 (the first front chamber path hole 140b and the first rear chamber path hole 140d), which does not communicate with the manifold holes of the manifold block 20, are hatched.

Next, the flow of the pressure oil and the operations of each part when the inner diameter of the workpiece W is clamped by the chuck 30B will be described with reference to FIGS. 16 and 17. When the inner diameter of the workpiece W is clamped by the chuck 30B, during rotation or stopping of the main shaft spindle 3, the pressure oil supplied from the pump is supplied from the first port 14c located at the rear end of the cylinder case 14 to the first main path 141 via the rotary joint 13, guided forward, and flows into the fifth manifold hole 20e of the manifold block 20 via the first main path hole 140a, as indicated by the solid line arrow in FIG. 16. The pressure oil flowing into the fifth manifold hole 20e flows in the third intermediate path 20R and flows into the second rear chamber path hole 140f of the cylinder case 14 via the sixth manifold hole 20f. The pressure oil flowing into the second rear chamber path hole 140f flows into the rear chamber 14b via the second rear chamber path 146, and the piston 15 is pushed forward and moved forward.

Along with the forward movement of the piston 15, the pressure oil in the front chamber 14a flows out to the second front chamber path 145 and is guided forward, and then flows into the eighth manifold hole 20h of the manifold block 20 via the second front chamber path hole 140h, as indicated by the broken line arrow in FIG. 16. The pressure oil flowing into the eighth manifold hole 20h flows in the fourth intermediate path 20S, and flows into the second main path hole 140c of the cylinder case 14 via the seventh manifold hole 20g. The pressure oil flowing into the second main path hole 140c is guided rearward by the second main path 144, and is discharged from the second port 14d to the outside of the device.

The push rod 15a which is integral with the piston 15 is moved forward, so that the wedge plunger 32 of the chuck 30B is pushed forward to move the master jaw 33 in the outer peripheral direction, and the inner diameter of the workpiece W is gripped by the claws 34.

On the other hand, when the workpiece W is unclamped, during stopping of the main shaft spindle 3, the pressure oil supplied from the pump is supplied to the second main path 144 via the second port 14d located at the rear end of the cylinder case 14, guided forward, and flows into the seventh manifold hole 20g of the manifold block 20 via the second main path hole 140c, as indicated by the solid line arrow in FIG. 17. The pressure oil flowing into the seventh manifold hole 20g flows in the fourth intermediate path 20S, and flows into the second front chamber path hole 140h of the cylinder case 14 via the eighth manifold hole 20h. The pressure oil flowing into the second front chamber path hole 140h flows into the front chamber 14a via the second front chamber path 145, and the piston 15 is pushed rearward and moved backward.

Along with the backward movement of the piston 15, the pressure oil in the rear chamber 14b flows out to the second rear chamber path 146 and is guided forward, and then flows into the sixth manifold hole 20f of the manifold block 20 via the second rear chamber path hole 140f, as indicated by the broken line arrow in FIG. 17. The pressure oil flowing into the sixth manifold hole 20f flows in the third intermediate path 20R and flows into the first main path hole 140a of the cylinder case 14 via the fifth manifold hole 20e. The pressure oil flowing into the first main path hole 140a is guided rearward by the first main path 141, and is discharged from the first port 14c to the outside of the device via the rotary joint 13.

The push rod 15a which is integral with the piston 15 is moved backward, so that the wedge plunger 32 of the chuck 30B is pulled rearward to pull the master jaw 33 toward the center, and the gripping of the inner diameter of the workpiece W performed by the claws 34 is released.

As described above, the present modification also allows easily switching between the pressure oil paths for use of the outer diameter gripping chuck 30A and the pressure oil paths for use of the inner diameter gripping chuck 30B simply by changing the phase of the manifold block 20 by 90° around the central axis with respect to the cylinder case 14 between the first phase and the second phase without performing component replacement of the cylinder case 14 or the like.

In the embodiment described above, the first intermediate path 20P and the fourth intermediate path 20S in the present modification are commonly used as the first intermediate path 20P, the second intermediate path 20Q and the third intermediate path 20R are commonly used as the second intermediate path 20Q, and the two intermediate paths are provided in the manifold block 20. Therefore, the embodiment described above has an advantage that a path structure of the manifold block 20 is simpler and easier to manufacture.

(6. Second Modification)

Figure 18:
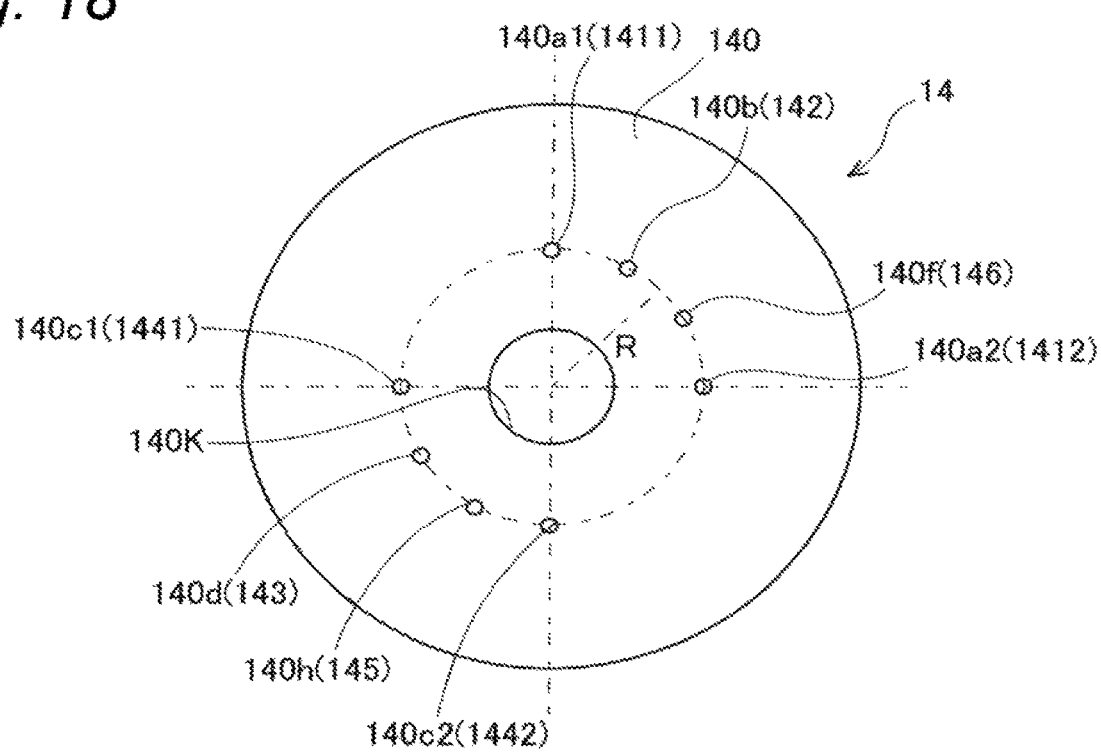
FIG. 18 is a front view of a front end surface of a cylinder case according to a second modification.
Figure 19:
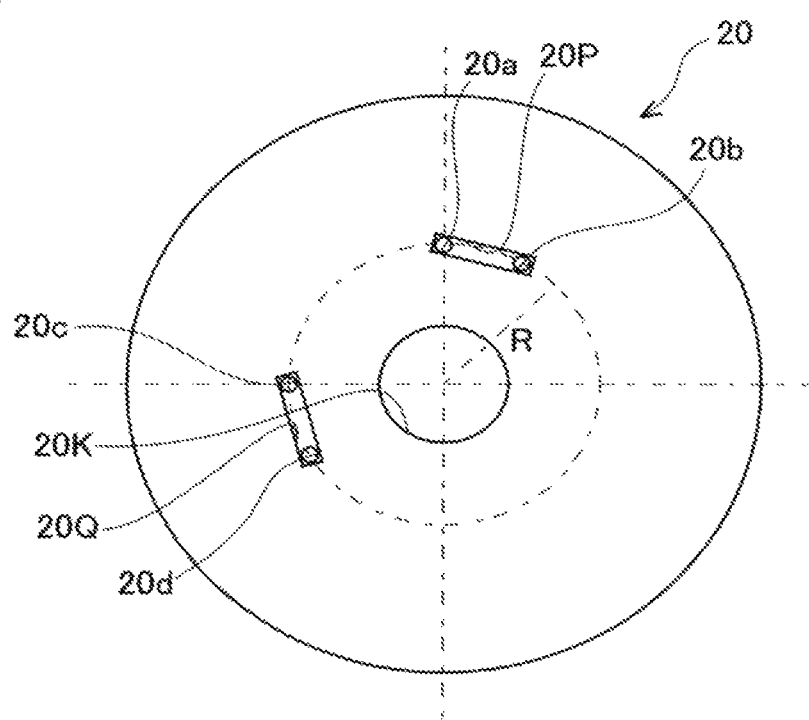
FIG. 19 is a cross-sectional view corresponding to FIG. 4 showing a manifold block according to the second modification.
Figure 20:
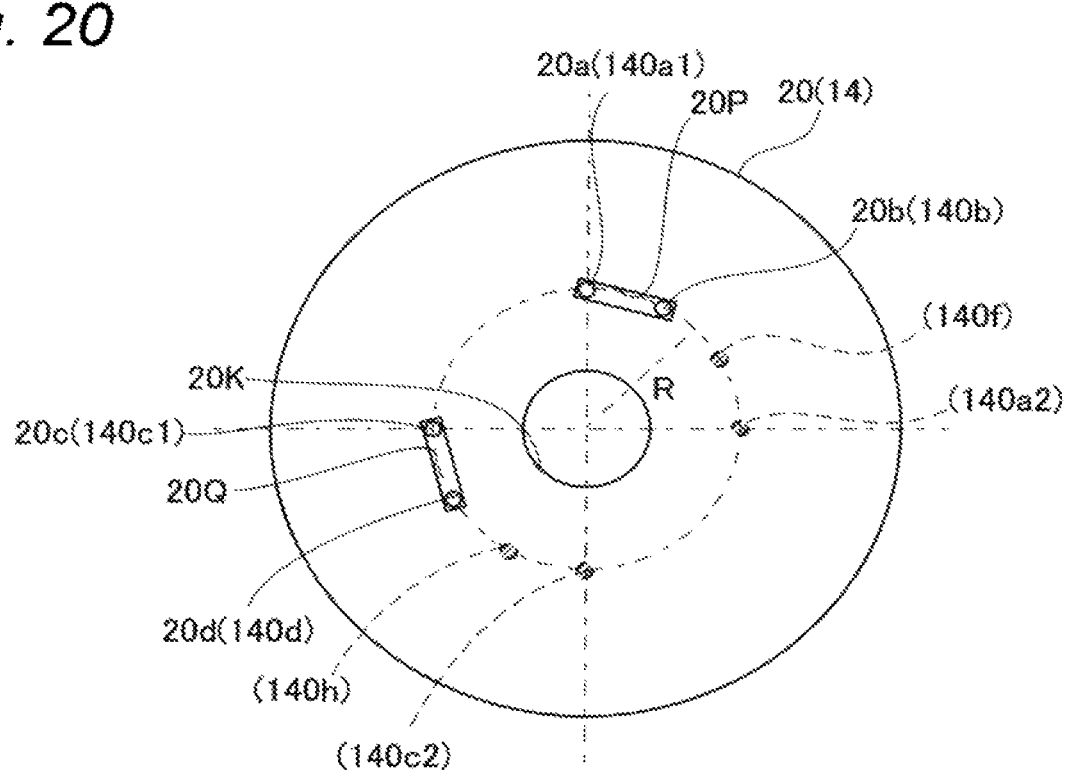
FIG. 20 is a cross-sectional view showing a positional relationship between holes of the manifold block and the cylinder case when the outer diameter gripping chuck is used in the second modification.
Figure 21:
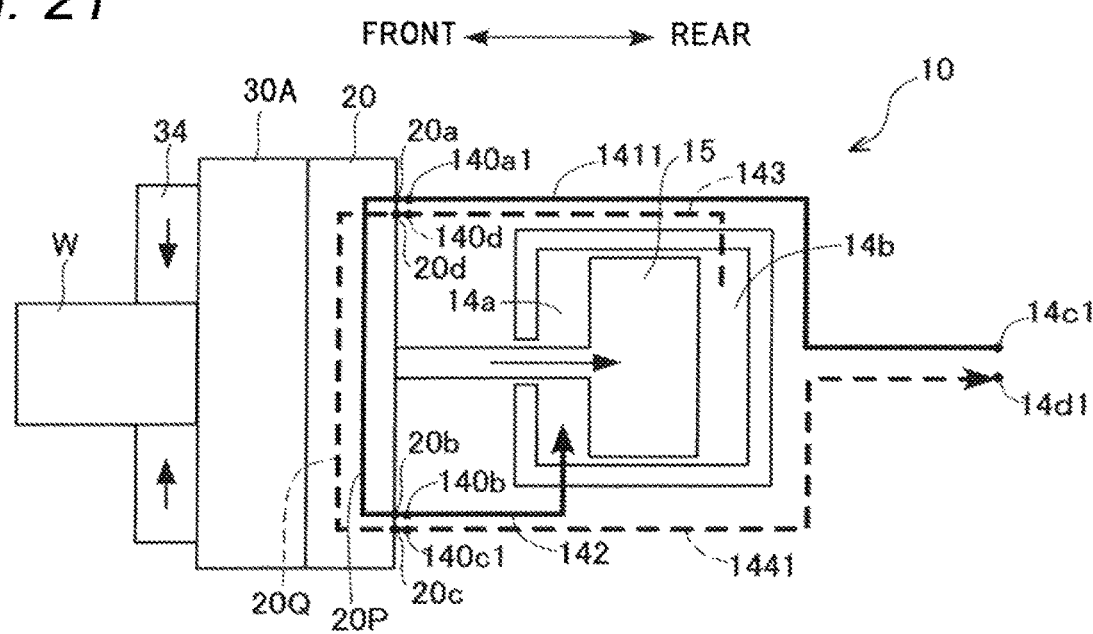
FIG. 21 is a schematic view showing a flow of pressure oil during clamping of the outer diameter gripping chuck in the second modification.
Figure 22:
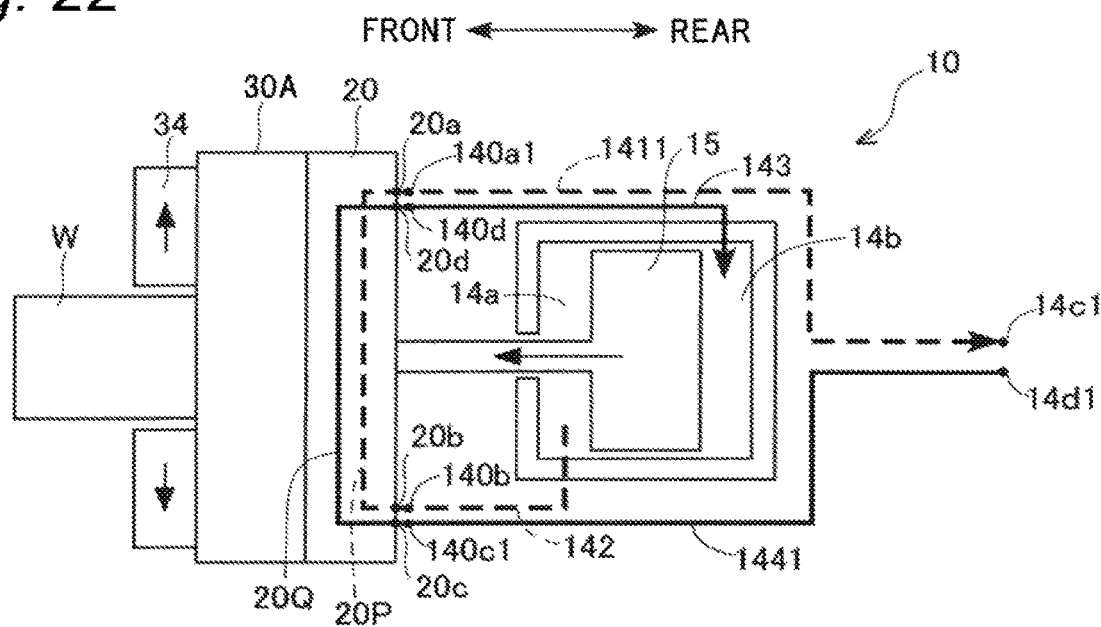
FIG. 22 is a schematic view showing the flow of the pressure oil during unclamping of the outer diameter gripping chuck in the second modification.
Figure 23:
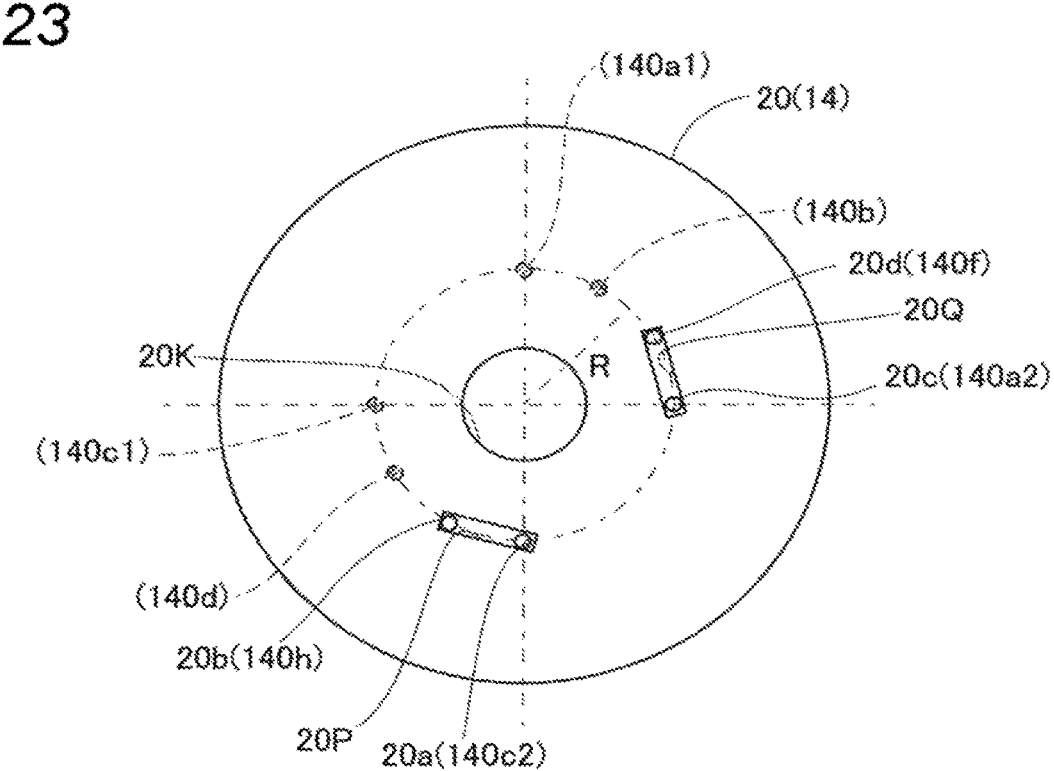
FIG. 23 is a cross-sectional view showing the positional relationship between the holes of the manifold block and the cylinder case when the inner diameter gripping chuck is used in the second modification.
Figure 24:
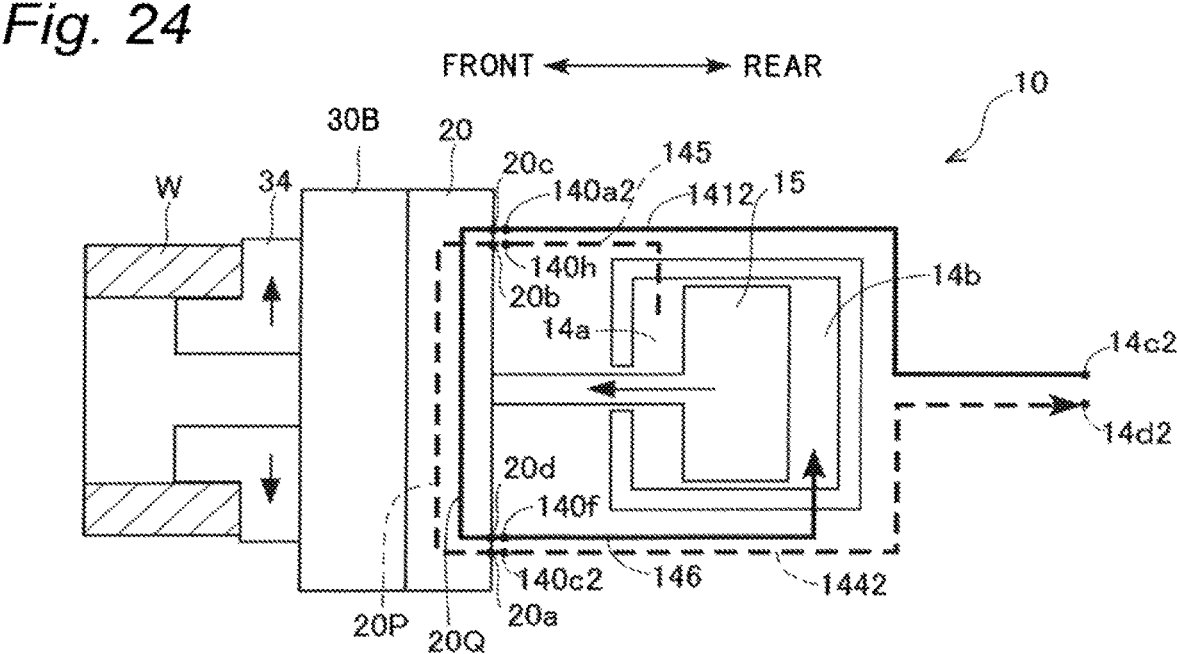
FIG. 24 is a schematic view showing the flow of the pressure oil during clamping of the inner diameter gripping chuck in the second modification.
Figure 25:
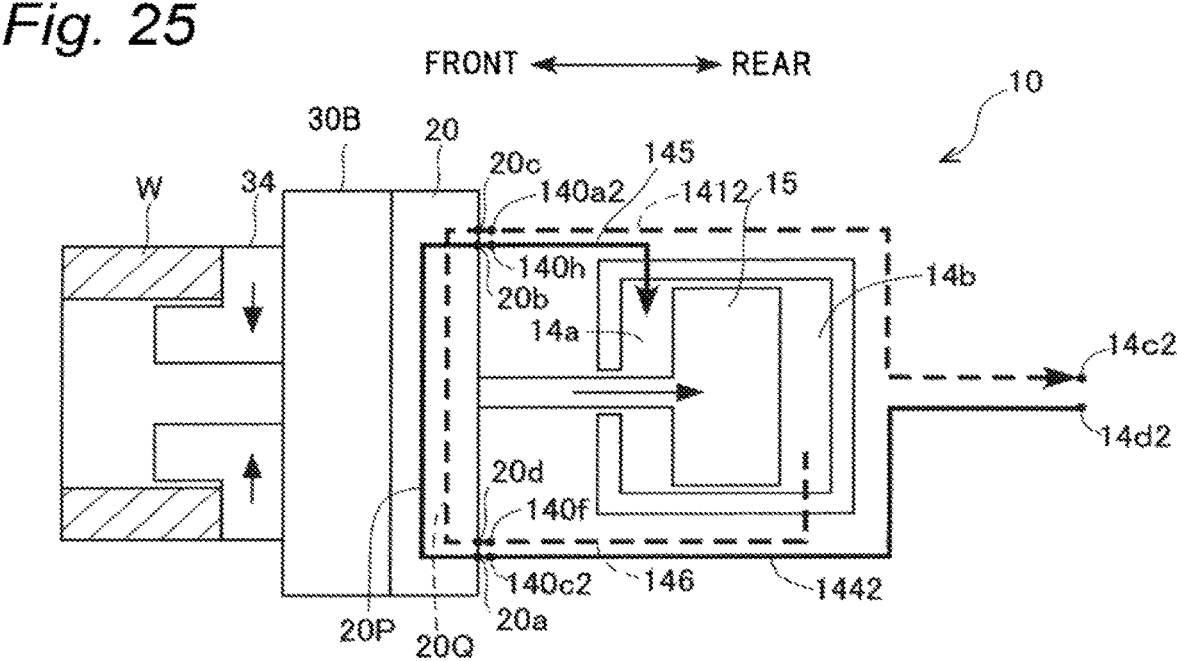
FIG. 25 is a schematic view showing the flow of the pressure oil during unclamping of the inner diameter gripping chuck in the second modification.

Although examples in which the six paths are provided in the cylinder case 14 are described in the above embodiment and the first modification, eight paths are provided in the cylinder case 14 in a second modification. Moreover, in the present modification, as in the above embodiment, the four manifold holes and the two intermediate paths are provided in the manifold block 20. Hereinafter, a configuration and operations of the second modification will be described with reference to FIGS. 18 to 25. FIG. 18 is a front view of the front end surface 140 of the cylinder case 14 according to the present modification. FIG. 19 is a cross-sectional view corresponding to FIG. 4 showing the manifold block 20 according to the present modification. FIG. 20 is a cross-sectional view showing the positional relationship between the holes of the manifold block 20 and the cylinder case 14 when the outer diameter gripping chuck 30A is used in the present modification. FIG. 21 is a schematic view showing the flow of the pressure oil during clamping of the outer diameter gripping chuck 30A in the present modification, and FIG. 22 is a schematic view showing the flow of the pressure oil during unclamping. FIG. 23 is a cross-sectional view showing the positional relationship between the holes of the manifold block 20 and the cylinder case 14 when the inner diameter gripping chuck 30B is used in the present modification. FIG. 24 is a schematic view showing the flow of the pressure oil during clamping of the inner diameter gripping chuck 30B in the present modification, and FIG. 25 is a schematic view showing the flow of the pressure oil during unclamping.

As shown in FIG. 18, the cylinder case 14 of the present modification includes: a first supply and discharge path 1411 which includes a first supply and discharge path hole 140a1; the first front chamber path 142 which includes the first front chamber path hole 140b; the second rear chamber path 146 which includes the second rear chamber path hole 140f; a second supply and discharge path 1412 which includes a second supply and discharge path hole 140a2; a fourth supply and discharge path 1442 which includes a fourth supply and discharge path hole 140c2; the second front chamber path 145 which includes the second front chamber path hole 140h; the first rear chamber path 143 which includes the first rear chamber path hole 140d; and a third supply and discharge path 1441 which includes a third supply and discharge path hole 140c1. The holes are arranged on the circumference of the circle having the radius R from the axial center of the cylinder case front end surface 140.

When the first supply and discharge path hole 140a1 is located at the 12 o'clock position, the first front chamber path hole 140b is arranged at the 1 o'clock position, the second rear chamber path hole 140f is arranged at the 2 o'clock position, the second supply and discharge path hole 140a2 is arranged at the 3 o'clock position, the fourth supply and discharge path hole 140c2 is arranged at the 6 o'clock position, the second front chamber path hole 140h is arranged at the 7 o'clock position, the first rear chamber path hole 140d is arranged at the 8 o'clock position and the third supply and discharge path hole 140c1 is arranged at the 9 o'clock position.

The first supply and discharge path 1411 is a pressure oil path having the same configuration as that of the first main path 141 in the above embodiment, and includes a first supply and discharge port 14c1 having the same configuration as that of the first port 14c at the rear end. The second supply and discharge path 1412 is a pressure oil path having the same configuration as that of the first supply and discharge path 1411, and is provided at a position shifted form a rotational position of the first supply and discharge path 1411 by 90° in a clockwise direction. The second supply and discharge path 1412 includes a second supply and discharge port 14c2 having the same configuration as that of the first port 14c1 at the rear end.

The fourth supply and discharge path 1442 is a pressure oil path having the same configuration as that of the second main path 144 in the above embodiment, and includes a fourth supply and discharge port 14d2 having the same configuration as that of the second port 14d at the rear end. The third supply and discharge path 1441 is a pressure oil path having the same configuration as that of the four supply and discharge path 1442, and is provided at a position shifted form a rotational position of the fourth supply and discharge path 1442 by 90° in the clockwise direction. The third supply and discharge path 1441 includes a third supply and discharge port 14d1 having the same configuration as that of the fourth supply and discharge port 14d2 at the rear end.

In the manifold block 20 according to the present modification, as shown in FIG. 19, the four (first to fourth) manifold holes 20a to 20d are arranged on the same circumference of the circle having the radius R with respect to the axial center. Among the first to fourth manifold holes 20a to 20d, when the first manifold hole 20a is located at the 12 o'clock position as viewed from the axial center of the manifold block 20, the second manifold hole 20b is arranged at the 1 o'clock position, the third manifold hole 20c is arranged at the 9 o'clock position, and the fourth manifold hole 20d is arranged at the 8 o'clock position.

The first manifold hole 20a and the second manifold hole 20b communicate with each other via the first intermediate path 20P extending in the direction intersecting the axial direction. Similarly, the third manifold hole 20c and the fourth manifold hole 20d communicate with each other via the second intermediate path 20Q extending in the direction intersecting the axial direction.

When the outer diameter gripping chuck 30A is used, the manifold block 20 is fastened and fixed to the front end of the main shaft spindle 3 by bolts with the manifold block abutting surface 200 being abutted against the cylinder case front end surface 140 in the first phase in which the first manifold hole 20a and the first supply and discharge path hole 140a1 are aligned, as shown in FIG. 20. In the first phase, the first manifold hole 20a and the first supply and discharge path hole 140a1, the second manifold hole 20b and the first front chamber path hole 140b, the third manifold hole 20c and the third supply and discharge path hole 140c1, and the fourth manifold hole 20d and the first rear chamber path hole 140d are aligned and communicated with each other, respectively.

On the other hand, the second rear chamber path hole 140f, the second supply and discharge path hole 140a2, the fourth supply and discharge path hole 140c2, and the second front chamber path hole 140h are not aligned with any one of the manifold holes, and are closed by the abutting surface 200 of the manifold block 20. In FIG. 20, the path holes (the second rear chamber path hole 140f, the second supply and discharge path hole 140a2, the fourth supply and discharge path hole 140c2, and the second front chamber path hole 140h), which does not communicate with the manifold holes, are hatched.

When the outer diameter of the workpiece W is clamped by the chuck 30A, during rotation or stopping of the main shaft spindle 3, the pressure oil supplied from the pump is supplied from the first supply and discharge port 14c1 located at the rear end of the cylinder case 14 to the first supply and discharge path 1411 via the rotary joint 13, guided forward, and flows into the first manifold hole 20a of the manifold block 20 via the first supply and discharge path hole 140a1, as indicated by the solid line arrow in FIG. 21. The pressure oil flowing into the first manifold hole 20a flows in the first intermediate path 20P, and flows into the first front chamber path hole 140b of the cylinder case 14 via the second manifold hole 20b. The pressure oil flowing into the first front chamber path hole 140b flows into the front chamber 14a via the first front chamber path 142, and the piston 15 is pushed rearward and moved backward.

Along with the backward movement of the piston 15, the pressure oil in the rear chamber 14b flows out to the first rear chamber path 143 and is guided forward, and then flows into the fourth manifold hole 20d of the manifold block 20 via the first rear chamber path hole 140d, as indicated by the broken line arrow in FIG. 21. The pressure oil flowing into the fourth manifold hole 20d flows in the second intermediate path 20Q and flows into the third supply and discharge path hole 140c1 of the cylinder case 14 via the third manifold hole 20c. The pressure oil flowing into the third supply and discharge path hole 140c1 is guided rearward by the third supply and discharge path 1441, and is discharged from the third supply and discharge port 140d1 to the outside of the device.

The push rod 15a which is integral with the piston 15 is moved backward, so that the wedge plunger 32 of the chuck 30A is pulled rearward to pull the master jaw 33 toward the center, and the outer diameter of the workpiece W is gripped by the claws 34.

On the other hand, when the workpiece W is unclamped, during stopping of the main shaft spindle 3, the pressure oil supplied from the pump is supplied to the third supply and discharge path 1441 via the third supply and discharge port 14d1 located at the rear end of the cylinder case 14, guided forward, and flows into the third manifold hole 20c of the manifold block 20 via the third supply and discharge path hole 140c1, as indicated by the solid line arrow in FIG. 22. The pressure oil flowing into the third manifold hole 20c flows in the second intermediate path 20Q and flows into the first rear chamber path hole 140d of the cylinder case 14 via the fourth manifold hole 20d. The pressure oil flowing into the first rear chamber path hole 140d flows into the rear chamber 14b via the first rear chamber path 143, and the piston 15 is pushed forward and moved forward.

Along with the forward movement of the piston 15, the pressure oil in the front chamber 14a flows out to the first front chamber path 142 and is guided forward, and then flows into the second manifold hole 20b of the manifold block 20 via the first front chamber path hole 140b, as indicated by the broken line arrow in FIG. 22. The pressure oil flowing into the second manifold hole 20b flows in the first intermediate path 20P, and flows into the first supply and discharge path hole 140a1 of the cylinder case 14 via the first manifold hole 20a. The pressure oil flowing into the first supply and discharge path hole 140a1 is guided rearward by the first supply and discharge path 1411, and is discharged from the first supply and discharge port 14c1 to the outside of the device via the rotary joint 13.

The push rod 15a which is integral with the piston 15 is moved forward, so that the wedge plunger 32 of the chuck 30A is pushed forward to move the master jaw 33 in the outer peripheral direction, and the gripping of the outer diameter of the workpiece W performed by the claws 34 is released.

When the inner diameter gripping chuck 30B is used, the manifold block 20 is attached to the front end of the main shaft spindle 3 in the second phase that is 180° out of phase around the central axis with respect to the first phase when the outer diameter gripping chuck 30A is used. That is, when the inner diameter gripping chuck 30B is used, as shown in FIG. 23, the manifold block 20 is fastened and fixed to the front end of the main shaft spindle 3 by bolts with the manifold block abutting surface 200 being abutted against the cylinder case front end surface 140 in the second phase in which the first manifold hole 20a and the fourth supply and discharge path hole 140c2 are aligned. In the second phase, the third manifold hole 20c and the second supply and discharge path hole 140a2, the fourth manifold hole 20d and the second rear chamber path hole 140f, the first manifold hole 20a and the fourth supply and discharge path hole 140c2, and the second manifold hole 20b and the second front chamber path hole 140h are aligned and communicated with each other, respectively.

On the other hand, the first supply and discharge path hole 140a1, the first front chamber path hole 140b, the third supply and discharge path hole 140c1, and the first rear chamber path hole 140d of the cylinder case 14 are not aligned with any one of the manifold holes of the manifold block 20, and are closed by the manifold block abutting surface 200. In FIG. 22, the path holes of the cylinder case 14 (the first supply and discharge path hole 140a1, the first front chamber path hole 140b, the third supply and discharge path hole 140c1, and the first rear chamber path hole 140d), which does not communicate with the manifold holes of the manifold block 20, are hatched in the second phase.

When the inner diameter of the workpiece W is clamped by the chuck 30B, during rotation or stopping of the main shaft spindle 3, the pressure oil supplied from the pump is supplied from the second supply and discharge port 14c2 located at the rear end of the cylinder case 14 to the second supply and discharge path 1412 via the rotary joint 13, guided forward, and flows into the third manifold hole 20c of the manifold block 20 via the second supply and discharge path hole 140a2, as indicated by the solid line arrow in FIG. 24. The pressure oil flowing into the third manifold hole 20c flows in the second intermediate path 20Q and flows into the second rear chamber path hole 140f of the cylinder case 14 via the fourth manifold hole 20d. The pressure oil flowing into the second rear chamber path hole 140f flows into the rear chamber 14b via the second rear chamber path 146, and the piston 15 is pushed forward and moved forward.

Along with the forward movement of the piston 15, the pressure oil in the front chamber 14a flows out to the second front chamber path 145 and is guided forward, and then flows into the second manifold hole 20b of the manifold block 20 via the second front chamber path hole 140h, as indicated by the broken line arrow in FIG. 24. The pressure oil flowing into the second manifold hole 20b flows in the first intermediate path 20P, and flows into the fourth supply and discharge path hole 140c2 of the cylinder case 14 via the first manifold hole 20a. The pressure oil flowing into the fourth supply and discharge path hole 140c2 is guided rearward by the fourth supply and discharge path 1442, and is discharged from the fourth supply and discharge port 14d2 to the outside of the device.

The push rod 15a which is integral with the piston 15 is moved forward, so that the wedge plunger 32 of the chuck 30B is pushed forward to move the master jaw 33 in the outer peripheral direction, and the inner diameter of the workpiece W is gripped by the claws 34.

On the other hand, when the workpiece W is unclamped, during stopping of the main shaft spindle 3, the pressure oil supplied from the pump is supplied to the fourth supply and discharge path 1442 via the fourth supply and discharge port 14d2 located at the rear end of the cylinder case 14, guided forward, and flows into the first manifold hole 20a of the manifold block 20 via the fourth supply and discharge path hole 140c2, as indicated by the solid line arrow in FIG. 25. The pressure oil flowing into the first manifold hole 20a flows in the first intermediate path 20P, and flows into the second front chamber path hole 140h of the cylinder case 14 via the second manifold hole 20b. The pressure oil flowing into the second front chamber path hole 140h flows into the front chamber 14a via the second front chamber path 145, and the piston 15 is pushed rearward and moved backward.

Along with the backward movement of the piston 15, the pressure oil in the rear chamber 14b flows out to the second rear chamber path 146 and is guided forward, and then flows into the fourth manifold hole 20d of the manifold block 20 via the second rear chamber path hole 140f, as indicated by the broken line arrow in FIG. 25. The pressure oil flowing into the fourth manifold hole 20d flows in the second intermediate path 20Q and flows into the second supply and discharge path hole 140a2 of the cylinder case 14 via the third manifold hole 20c. The pressure oil flowing into the second supply and discharge path hole 140a2 is guided rearward by the second supply and discharge path 1412, and is discharged from the second supply and discharge port 14c2 to the outside of the device via the rotary joint 13.

The push rod 15a which is integral with the piston 15 is moved backward, so that the wedge plunger 32 of the chuck 30B is pulled rearward to pull the master jaw 33 toward the center, and the gripping of the inner diameter of the workpiece W performed by the claws 34 is released.

In the above-described embodiment, the first supply and discharge port 14c1 and the second supply and discharge port 14c2 in the present modification are commonly used as the first port 14c, the first supply and discharge path 1411 and the second supply and discharge path 1412 are commonly used as the first main path 141, the third supply and discharge port 140d1 and the fourth supply and discharge port 14d2 are commonly used as the second port 14d, and the third supply and discharge path 1441 and the fourth supply and discharge path 1442 are commonly used as the second main path 144. The above embodiment has an advantage that path structures of the cylinder case 14 and the manifold block 20 are simpler and easier to manufacture. Moreover, in the above embodiment, since there is only one supply and discharge port provided with the rotary joint 13 (first port 14c), the structure is simplified and a cost thereof is reduced.

(7. Other Modifications)

The present invention is not limited to the embodiment described above, and various modifications can be made without departing from the gist of the present invention. For example, although the abutting surface 200 of the disc-shaped manifold block 20 is abutted against the front end surface 140 of the cylinder case 14 in which the path holes are opened in the above embodiment, the present invention is not limited thereto. For example, the path holes may be opened in an outer peripheral end surface of the cylinder case 14, while an inner periphery of the ring-shaped manifold block 20 may be formed in a ring shape, the manifold holes may be opened in an inner peripheral end surface thereof, and the inner peripheral end surface may be configured as the abutting surface.

What is claimed is:

1. A workpiece gripping device comprising:
    a chuck including an operation body capable of moving forward and backward along an axial direction of a central axis and a plurality of claws arranged around the central axis, the plurality of claws being capable of moving in a radial direction along with forward and backward movement of the operation body;
    a fluid pressure cylinder including a cylinder case coaxially arranged on a rear side of the chuck and a piston fitted in an internal space of the cylinder case and dividing the internal space in the axial direction into a front chamber and a rear chamber, the piston being configured to drive the operation body forward and backward; and
    a manifold block including an abutting surface and first to fourth intermediate paths communicating respective pairs of manifold holes opened in the abutting surface,
    the cylinder case including:
    first and second supply and discharge paths respectively communicating first and second supply and discharge ports with an end surface of the cylinder case, the first and second supply and discharge ports being configured to supply and discharge a fluid;
    third and fourth supply and discharge paths respectively communicating third and fourth supply and discharge ports with the end surface, the third and fourth supply and discharge ports being configured to supply and discharge a fluid;
    first and second front chamber paths communicating the front chamber with the end surface; and
    first and second rear chamber paths communicating the rear chamber with the end surface,
    wherein the manifold block is configured to be attached and fixed to the cylinder case such that the abutting surface is abutted against the end surface and a relative position of the abutting surface with respect to the end surface portion is capable of being selected from a first position and a second position,
    when the manifold block is attached and fixed to the cylinder case at the first position, the first supply and discharge path communicates with the first front chamber path via the first intermediate path, and the first rear chamber path communicates with the third supply and discharge path via the second intermediate path, and
    when the manifold block is attached and fixed to the cylinder case at the second position, the second supply and discharge path communicates with the second rear chamber path via the third intermediate path, and the second front chamber path communicates with the fourth supply and discharge path via the fourth intermediate path.

2. The workpiece gripping device according to claim 1, wherein first and second supply and discharge path holes that serve as end portions of the first and second supply and discharge paths, third and fourth supply and discharge path holes that serve as end portions of the third and fourth supply and discharge paths, first and second front chamber path holes that serve as end portions of the first and second front chamber paths, and first and second rear chamber path holes that serve as end portions of the first and second rear chamber paths are opened in the end surface of the cylinder case,
- first and second manifold holes communicating with each other through the first intermediate path, third and fourth manifold holes communicating with each other through the second intermediate path, fifth and sixth manifold holes communicating with each other through the third intermediate path and seventh and eighth manifold holes communicating with each other through the fourth intermediate path are opened in the abutting surface of the manifold block,
- when the manifold block is attached and fixed to the cylinder case at the first position, the first supply and discharge path hole and the first manifold hole are aligned with each other and the first front chamber path hole and the second manifold hole are aligned with each other such that the first supply and discharge path, the first intermediate path and the first front chamber path communicate with each other, while the first rear chamber path hole and the fourth manifold hole are aligned with each other and the third supply and discharge path hole and the third manifold hole are aligned with each other such that the first rear chamber path, the second intermediate path and the third supply and discharge path communicate with each other, and
- when the manifold block is attached and fixed to the cylinder case at the second position, the second supply and discharge path hole and the fifth manifold hole are aligned with each other and the second rear chamber path hole and the sixth manifold hole are aligned with each other such that the second supply and discharge path, the third intermediate path and the second rear chamber path communicate with each other, while the second front chamber path hole and the eighth manifold hole are aligned with each other and the fourth supply and discharge path hole and the seventh manifold hole are aligned with each other such that the second rear chamber path, the fourth intermediate path and the fourth supply and discharge path communicate with each other.

3. The workpiece gripping device according to claim 1 further comprising:
- a housing, the fluid pressure cylinder being rotatable around the central axis in the housing; and
- a rotary joint slidably provided on an outer surface of the cylinder case,
- wherein the first and second supply and discharge ports are provided in the rotary joint to allow the fluid to flow between the first and second supply and discharge paths and outside even when the fluid pressure cylinder is rotating.

4. The workpiece gripping device according to claim 1, wherein the end surface is a front end surface of the cylinder case, and
- the manifold block includes a central opening through which a push rod extending from the piston toward the chuck is inserted, and is coaxially arranged between the chuck and the cylinder case and is attached and fixed to the cylinder case such that the abutting surface is abutted against the front end surface of the cylinder case.

5. The workpiece gripping device according to claim 2, wherein the cylinder case and the manifold block are arranged coaxially,
- the first to fourth supply and discharge path holes, the first and second front chamber path holes, and the first and second rear chamber path holes are arranged on a circumference of a circle having a predetermined radius from a center of the end surface of the cylinder case such that rotational positions thereof are shifted from each other,
- the first to eighth manifold holes are arranged on a circumference of a circle having a same radius as the predetermined radius from a center of the abutting surface of the manifold block such that rotational positions thereof are shifted from each other, and
- the first position is a first phase around the central axis with respect to the cylinder case, and the second position is a second phase that differs from the first phase by a predetermined phase angle.

6. The workpiece gripping device according to claim 1, wherein the first supply and discharge port and the second supply and discharge port, the first supply and discharge path and the second supply and discharge path, the third supply and discharge port and the fourth supply and discharge port, and the third supply and discharge path and the fourth supply and discharge path are common to each other, respectively.

7. The workpiece gripping device according to claim 1, wherein the first intermediate path and the fourth intermediate path, and the second intermediate path and the third intermediate path are common to each other, respectively.

* * * * *